(12) United States Patent
Suzuki et al.

(10) Patent No.: US 12,162,167 B2
(45) Date of Patent: Dec. 10, 2024

(54) METHOD OF TEACHING ROBOT AND ROBOT SYSTEM

(71) Applicant: CANON KABUSHIKI KAISHA, Tokyo (JP)

(72) Inventors: Hideaki Suzuki, Kawasaki (JP); Keita Dan, Tokyo (JP); Naoki Tsukabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 17/134,758

(22) Filed: Dec. 28, 2020

(65) Prior Publication Data

US 2021/0114221 A1 Apr. 22, 2021

Related U.S. Application Data

(63) Continuation of application No. 15/889,804, filed on Feb. 6, 2018, now Pat. No. 10,906,182.

(30) Foreign Application Priority Data

Feb. 9, 2017 (JP) ................................. 2017-022565

(51) Int. Cl.
*B25J 9/16* (2006.01)
*B25J 9/00* (2006.01)
(Continued)

(52) U.S. Cl.
CPC ........... *B25J 9/1692* (2013.01); *B25J 9/0081* (2013.01); *B25J 9/0096* (2013.01); *B25J 9/1656* (2013.01); *B25J 9/1664* (2013.01); *B25J 9/1687* (2013.01); *B25J 9/1697* (2013.01); *B25J 15/0014* (2013.01); *B25J 15/009* (2013.01); *B25J 15/0253* (2013.01); *B25J 15/08* (2013.01);
(Continued)

(58) Field of Classification Search
CPC ...... B25J 9/1692; B25J 9/0081; B25J 9/0096; B25J 9/1656; B25J 9/1664; B25J 9/1687; B25J 9/1697; B25J 15/0014; B25J 15/009; B25J 15/0253; B25J 15/08; B25J 15/103; G05B 2219/36401; G05B 2219/36431; G05B 2219/39057; Y10S 901/04; Y10S 901/31; Y10S 901/47
See application file for complete search history.

(56) References Cited

U.S. PATENT DOCUMENTS 4,954,744 A 9/1990 Suzuki et al.
4,956,578 A 9/1990 Shimizu et al.
(Continued)

FOREIGN PATENT DOCUMENTS

JP 60-097285 U 7/1985
JP 07-084631 A 3/1995
(Continued)

*Primary Examiner* — Jason Holloway
(74) *Attorney, Agent, or Firm* — Venable LLP

(57) ABSTRACT

A robot system includes a robot, a vision sensor, and a controller. The vision sensor is configured to be detachably attached to the robot. The controller is configured to measure a reference object by using the vision sensor and calibrate a relative relationship between a sensor portion of the vision sensor and an engagement portion of the vision sensor, and teach the robot by referring to the relative relationship and by using the vision sensor, after the vision sensor is attached to the robot.

20 Claims, 13 Drawing Sheets

(51) Int. Cl.
- *B25J 15/00* (2006.01)
- *B25J 15/02* (2006.01)
- *B25J 15/08* (2006.01)
- *B25J 15/10* (2006.01)

(52) U.S. Cl.
CPC ... *B25J 15/103* (2013.01); *G05B 2219/36401* (2013.01); *G05B 2219/36431* (2013.01); *G05B 2219/39057* (2013.01); *Y10S 901/04* (2013.01); *Y10S 901/31* (2013.01); *Y10S 901/47* (2013.01)

(56) References Cited

U.S. PATENT DOCUMENTS

| | | |
|---|---|---|
| 5,155,416 A | 10/1992 | Suzuki et al. |
| 5,530,314 A | 6/1996 | Banno et al. |
| 5,572,103 A | 11/1996 | Terada |
| 5,586,387 A | 12/1996 | Nakatani et al. |
| 5,645,462 A | 7/1997 | Banno et al. |
| 5,650,795 A | 7/1997 | Banno et al. |
| 5,838,097 A | 11/1998 | Kasanuki et al. |
| 6,157,137 A | 12/2000 | Suzuki et al. |
| 6,236,167 B1 | 5/2001 | Yamaguchi et al. |
| 7,899,577 B2 | 3/2011 | Ban et al. |
| 7,983,476 B2 | 7/2011 | Tate et al. |
| 9,027,231 B2 | 5/2015 | Mimura et al. |
| 9,278,454 B2 | 3/2016 | Minura et al. |
| 9,669,545 B2 | 6/2017 | Suzuki et al. |
| 2005/0102060 A1 | 5/2005 | Watanabe et al. |
| 2005/0107920 A1 | 5/2005 | Ban et al. |
| 2006/0072809 A1 | 4/2006 | Hashimoto et al. |
| 2008/0004750 A1 | 1/2008 | Ban et al. |
| 2008/0300723 A1 | 12/2008 | Ban et al. |
| 2013/0086801 A1 | 4/2013 | Mimura et al. |
| 2014/0046486 A1 | 2/2014 | Mimura et al. |
| 2015/0088311 A1* | 3/2015 | Suzuki ............... B25J 9/1697 700/254 |
| 2016/0059419 A1 | 3/2016 | Suzuki |
| 2016/0151915 A1* | 6/2016 | Nishi ............... B25J 9/1697 901/6 |
| 2017/0217020 A1 | 8/2017 | Suzuki et al. |

FOREIGN PATENT DOCUMENTS

| | | |
|---|---|---|
| JP | H07-098208 A | 4/1995 |
| JP | H07-798208 A | 4/1995 |
| JP | 08-328624 A | 12/1996 |
| JP | H11-254362 A | 9/1999 |
| JP | 2005-138223 A | 6/2005 |
| JP | 2014-034075 A | 2/2014 |
| JP | 2016-052695 A | 4/2016 |

* cited by examiner

METHOD OF TEACHING ROBOT AND ROBOT SYSTEM

BACKGROUND OF THE INVENTION

Field of the Invention

The present invention relates to teaching a robot.

Description of the Related Art

In factories, a robot system is used to automate work, such as transfer of parts, assembly, and processing. The robot system has a robot which has multiple degrees of freedom. Examples of the robot having multiple degrees of freedom include a vertically articulated robot, a horizontally articulated robot, a Cartesian coordinate robot, and a parallel link robot. A user can cause a robot to move in accordance with a robot program, and thereby can cause the robot to perform a variety of types of work for respective purposes.

In order to cause a robot to perform production work, such as transfer of workpieces and assembly, a user needs to teach a robot a posture of the robot in advance. Teaching a robot is typically performed by a user using a teaching pendant to perform jog feed of the robot to cause the robot to take a posture for work and causing a storage unit to store the posture. When a user causes a robot to perform work which needs precision, the user needs to determine a relative position and orientation, with high accuracy, between an object such as a workpiece or a workpiece holding jig, and an end effector such as a hand or a tool attached to the robot, and teach the robot the relative position and orientation.

Japanese Patent Application Publication No. H7-84631 proposes a technique to correct a teach position of a robot. In this technique, a three-dimensional vision sensor is attached to a welding robot in place of, or in parallel with a welding torch, a mark formed on an object to be worked is measured by using the vision sensor, and thereby a teach position of the robot is corrected. The technique of Japanese Patent Application Publication No. H7-84631 calibrates the relationship between the robot and the vision sensor, and corrects the teach position by using information on a mark position seen from the vision sensor, in a state where the vision sensor is attached to the robot.

However, because the robot has an error in its posture, the vision sensor attached to the robot also has an error in its position and orientation. As a result, in the technique of Japanese Patent Application Publication H7-84631, the error in posture of the robot affects the accuracy of the calibration, thus reducing the accuracy of teaching the robot.

SUMMARY OF THE INVENTION

According to a first aspect of the present invention, a method of teaching a robot includes measuring a reference object by using a vision sensor and calibrating a relative relationship between a sensor portion of the vision sensor and an engagement portion of the vision sensor, attaching the engagement portion of the vision sensor to a robot, after the calibrating, and teaching the robot by referring to the relative relationship and by using the vision sensor.

According to a second aspect of the present invention, a robot system includes a robot, a vision sensor configured to be detachably attached to the robot, and a controller. The controller is configured to measure a reference object by using the vision sensor and calibrate a relative relationship between a sensor portion of the vision sensor and an engagement portion of the vision sensor, and teach the robot by referring to the relative relationship and by using the vision sensor, after the vision sensor is attached to the robot.

Further features of the present invention will become apparent from the following description of exemplary embodiments with reference to the attached drawings.

DESCRIPTION OF THE EMBODIMENTS

Hereinafter, some embodiments of the present invention will be described in detail with reference to the accompanying drawings.

First Embodiment

Figure 1:
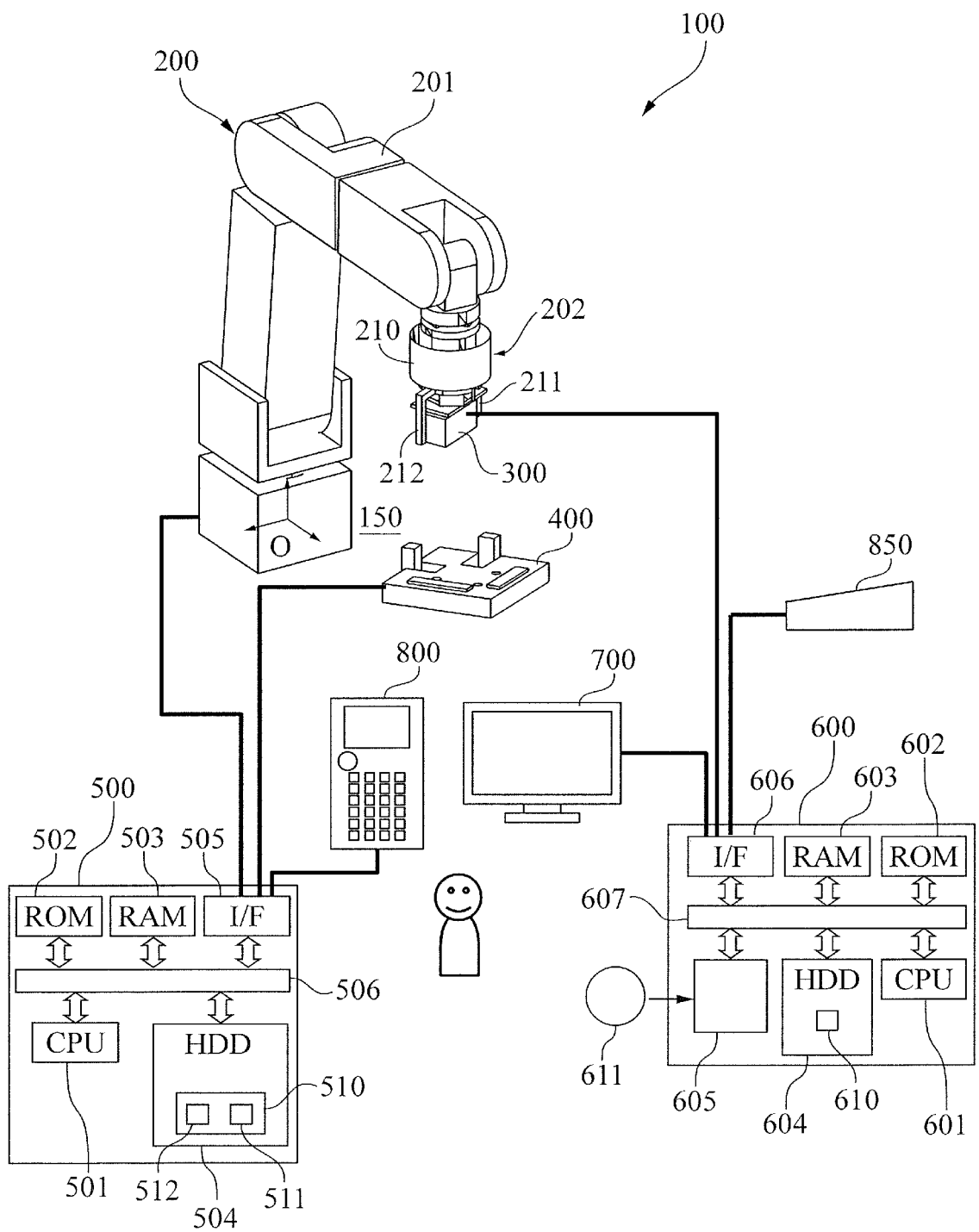
FIG. 1 is an explanatory diagram of a robot system of a first embodiment.

FIG. 1 is an explanatory diagram of a robot system of a first embodiment. A robot system 100 includes a robot 200, a stereo camera 300 which is one example of vision sensors, a workpiece holding jig 400, a robot control device 500, a sensor control device 600, and a display 700. The robot system 100 also includes a teaching pendant 800 and an input device 850, which are one example of operation devices. The robot 200 includes a robot arm 201, and a robot hand 202 which is one example of end effectors. The robot arm 201 is a vertically articulated robot arm. The base end of the robot 200, that is, the base end of the robot arm 201 is fixed to a stand 150.

The leading end of the robot arm 201 is provided with the robot hand 202 attached thereto, directly or via a force sensor (not illustrated). That is, the leading end of the robot 200, which serves as a hand of the robot 200, is the robot hand 202. The robot hand 202 includes a palm unit 210 which is a hand body, and a plurality of fingers 211 and 212 which can open and close with respect to the palm unit 210. In the first embodiment, the number of the fingers is two. With these components, the robot hand 202 can hold or release a workpiece. The palm unit 210 includes a housing and a driving mechanism which is housed by the housing and configured to drive the fingers 211 and 212.

The workpiece holding jig 400 is a jig which chucks a workpiece so that the workpiece does not move with respect to the stand 150, and is fixed to the stand 150. The workpiece holding jig 400 is disposed in an area within which the robot hand 202 can move. The leading end of the robot 200, that is, the robot hand 202 can move with six degrees of freedom, in a robot coordinate system O whose origin is at the base end of the robot 200. Specifically, the robot hand 202 can move in three translational directions and three rotational directions, with the motion of the robot arm 201. The translational directions correspond to three axes which are orthogonal to each other in the robot coordinate system O, and the rotational directions are directions around the three axes.

The teaching pendant 800 is used to send a command to the robot control device 500 through an operation by a user. Upon receiving the command, the robot control device 500 causes the robot 200 to move, depending on the command. That is, through the operation of the teaching pendant 800, the user can move the robot arm 201, and perform a jog feed of the robot hand 202 in any direction and at any speed. Also, through the operation of the teaching pendant 800, the user allows the robot 200 to open and close the fingers 211 and 212 of the robot hand 202.

The robot control device 500 mainly controls the motion of the robot 200. The sensor control device 600 mainly controls the operation of the stereo camera 300, and performs computing processes, such as image processing and a measurement process.

The robot control device 500 is a computer, and includes a central processing unit (CPU) 501. In addition, the robot control device 500 includes, as example of memories, a read only memory (ROM) 502, a random access memory (RAM) 503, and a hard disk drive (HDD) 504. The robot control device 500 also includes an interface (I/F) 505 and a bus 506. The CPU 501, the ROM 502, the RAM 503, the HDD 504, and the interface 505 are communicatively connected with each other via the bus 506.

The sensor control device 600 is a computer, and includes a CPU 601. In addition, the sensor control device 600 includes, as example of memories, a ROM 602, a RAM 603, and an HDD 604. The sensor control device 600 also includes a recording-disk drive 605, an interface (I/F) 606, and a bus 607. The CPU 601, the ROM 602, the RAM 603, the HDD 604, the disk drive 605, and the interface 606 are communicatively connected with each other via the bus 607.

The interface 505 of the robot control device 500 is connected to the robot 200, the workpiece holding jig 400, and the teaching pendant 800 via communication lines. The interface 606 of the sensor control device 600 is electrically connected to the stereo camera 300, the display 700, and the input device 850 via communication lines. The first embodiment has the configuration in which a user operates the teaching pendant 800 while watching a display screen of the display 700. Thus, the robot control device 500 and the sensor control device 600 may not be electrically connected with each other via a communication line or the like.

The ROM 502 of the robot control device 500 stores a base program. The RAM 503 is a memory to temporarily store various data, such as results of a computing process performed by the CPU 501. The HDD 504 stores a robot program 510 which defines the motion of the robot 200. The robot program 510 includes teach point information 511 and command information 512. The CPU 501 controls the motion of the robot 200 depending on the robot program 510, and causes the robot 200 to perform work, such as workpiece assembly work. When setting the teach point information 511, that is, when performing teaching work, the CPU 501 controls the motion of the robot 200 depending on a command from the teaching pendant 800. In addition, the CPU 501 can create or update the posture information, which is used when the robot 200 is actually moved, as the teach point information 511.

The ROM 602 of the sensor control device 600 stores a base program. The RAM 603 is a memory to temporarily store various data, such as results of a computing process performed by the CPU 601. The HDD 604 stores a program 610 used when the teaching is performed. The disk drive 605 can read various data or a program recorded on a disk 611. When teaching the robot 200, the CPU 601 controls the operation of the stereo camera 300 and controls the motion of the robot 200 via the robot control device 500, depending on the program 610. In addition, the CPU 601 controls displaying operation of the display 700. For example, the CPU 601 causes the display 700 to display image data captured by the stereo camera 300 and resultant data obtained by executing image processing, and provides information to a user. The input device 850 may be a keyboard or a mouse, and can output information, such as characters, numerical values, or a pointer position, to the sensor control device 600 by a user operating the input device 850 while watching the display 700.

The interface 505 of the robot control device 500 and the interface 606 of the sensor control device 600 can be electrically connected to an external memory (not illustrated). In the first embodiment, the description will be made for a case where the HDD 604 is a computer-readable recording medium and stores the program 610. However, the present disclosure is not limited to this. The program 610 may be recorded in any recording medium as long as the recording medium is a computer-readable recording medium. For example, the ROM 602, the disk 611, or an external memory (not illustrated) may be used as the recording medium that provides the program 610. Specifically, a flexible disk, an optical disk such as a CD-ROM or a DVD-ROM, a magneto-optical disk, a magnetic tape, a nonvolatile memory such as a USB memory, an SSD, or the like may be used as the recording medium.

Also in the first embodiment, the description has been made for the case where the robot control device 500 and the sensor control device 600 are each achieved by a single computer, and thus the robot system 100 has two computers in total. However, the present disclosure is not limited to this. Both functions of the robot control device 500 and the sensor control device 600 may be achieved by a single computer, or may be achieved by three or more computers which perform distributed processing. Furthermore, although the sensor control device 600 is disposed outside the housing of the stereo camera 300, a smart camera housed by the housing may achieve the same function.

Figure 2A:
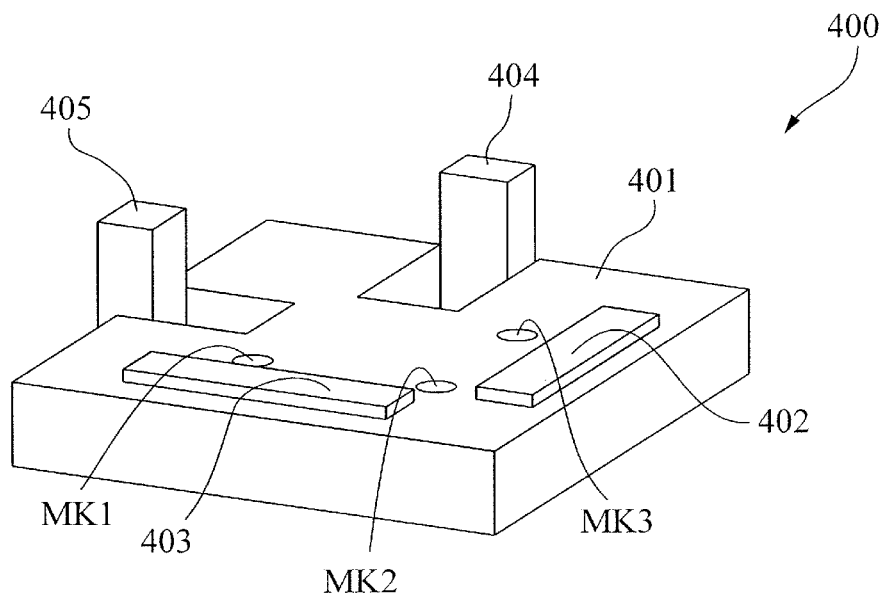
FIG. 2A is a perspective view of a workpiece holding jig of the first embodiment.
Figure 2B:
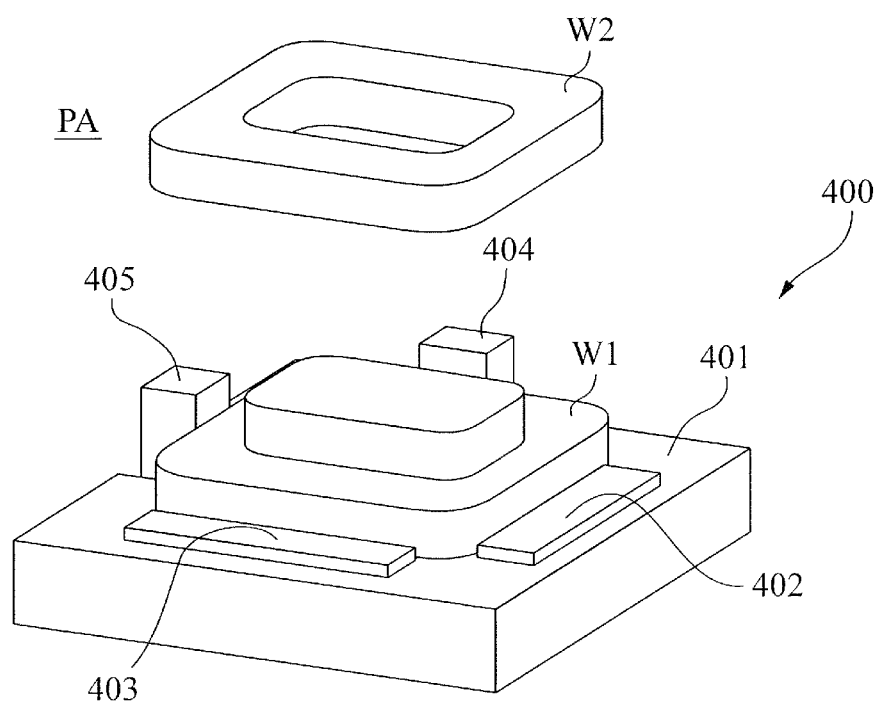
FIG. 2B is a perspective view of the workpiece holding jig, a first workpiece, and a second workpiece of the first embodiment.

FIG. 2A is a perspective view of a workpiece holding jig 400. FIG. 2B is a perspective view of the workpiece holding jig 400, a workpiece W1 which is a first workpiece, and a workpiece W2 which is a second workpiece. As illustrated in FIG. 2A, the workpiece holding jig 400 includes a base portion 401, work butted-against portions 402 and 403 which are fixed to the base portion 401, and jig fingers 404 and 405. The workpiece holding jig 400 can open and close the jig fingers 404 and 405, depending on the robot program 510. The workpiece W1 can be chucked by closing the jig fingers 404 and 405 in a state where the workpiece W1 is placed on the base portion 401.

FIG. 2B illustrates a state where the workpiece W1 is held by the workpiece holding jig 400. In the first embodiment, fitting work for the workpiece W1 and the workpiece W2 is performed as assembly work, in which the workpiece W2 is assembled to the workpiece W1. Specifically, the fitting work is performed by causing the workpiece holding jig 400 to hold the workpiece W1, causing the robot hand 202 to hold the workpiece W2, and moving the robot arm 201. As illustrated in FIG. 2B, when the fitting work is performed, the robot hand 202 holding the workpiece W2 is moved to a work start position PA which is directly above the workpiece W1, and then the workpiece W2 is moved from the work start position PA to a position directly below the work start position PA. Thus, a correct teaching is required to position the robot hand 202 correctly at the work start position PA, that is, to position the workpiece W2 correctly.

In the first embodiment, the workpiece holding jig 400 is a measured object used when the teaching work is performed. The workpiece holding jig 400 illustrated in FIG. 2A is provided with a plurality of marks MK1 to MK3. The marks MK1 to MK3 can be measured by the stereo camera 300, and are one example of feature points. The marks MK1 to MK3 are positioned with respect to mechanical references of the workpiece holding jig 400, with high accuracy. The mechanical references may be the work butted-against portions 402 and 403. The marks MK1 to MK3 are formed on the top face of the base portion 401, and have a predetermined precision range of thickness or depth in a height direction. The marks MK1 to MK3 are black so that they have a sufficient contrast to the base portion 401, and thus can be recognized with high accuracy as the feature points, through image processing. Here, any method may be used to provide the marks MK1 to MK3 to the base portion 401. For example, laser beam machining, printing, etching, plating, or sticking seals may be used to provide the marks. In addition, although the example is given for the case where the marks MK1 to MK3 are directly provided to the workpiece holding jig 400, the marks MK1 to MK3 may be temporarily arranged only in the teaching, by providing the marks to a reference plate which is another member, and attaching the reference plate to the workpiece holding jig 400.

In the first embodiment, the stereo camera 300 is used to teach the robot 200. The stereo camera 300 is detachably attached to the robot 200. Specifically, the stereo camera 300 is held by the robot hand 202 in a state where the stereo camera 300 is positioned with respect to the robot hand 202.

Figure 3A:
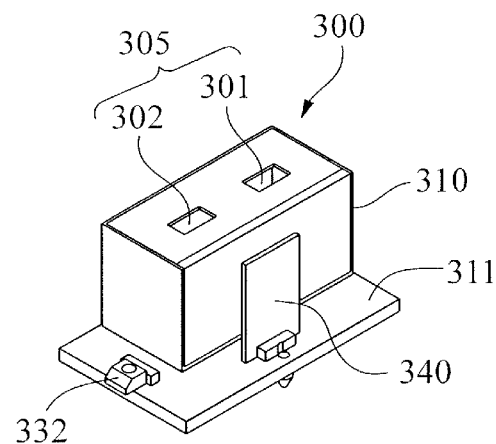
FIG. 3A is a perspective view of a stereo camera of the first embodiment.
Figure 3B:
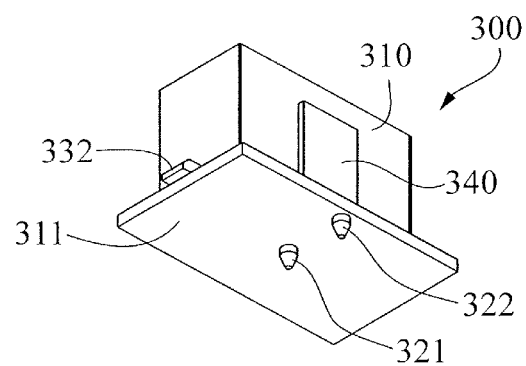
FIG. 3B is a perspective view of the stereo camera of the first embodiment.
Figure 3C:
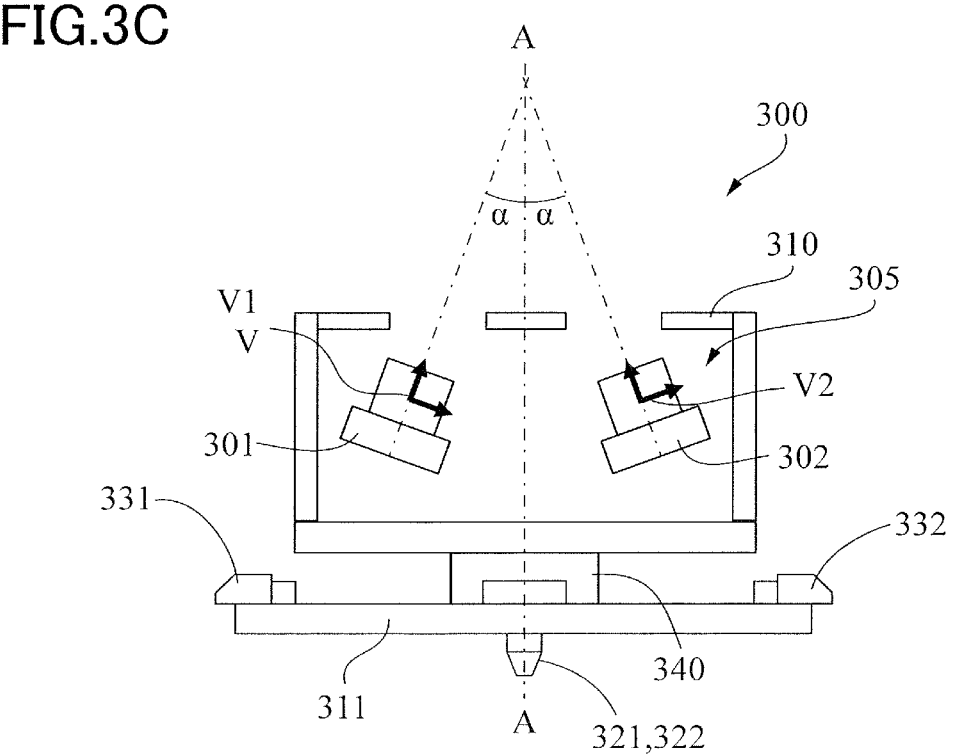
FIG. 3C is a cross-sectional view of the stereo camera of the first embodiment.

FIGS. 3A and 3B are perspective views of the stereo camera 300. FIG. 3C is a cross-sectional view of the stereo camera 300. The stereo camera 300 is a camera which captures images of a measured object by using the stereo method so that a three-dimensional position and orientation of the measured object can be measured. The stereo camera 300 can capture images upon receiving an imaging command from the sensor control device 600, and send the acquired image data to the sensor control device 600. The stereo camera 300 includes a sensor portion 305. The sensor portion 305 includes a camera 301 which is a first camera, and a camera 302 which is a second camera. The two cameras, 301 and 302, are disposed in the interior of a housing 310. The cameras 301 and 302 are digital cameras having an imaging device, such as a CCD image sensor or a CMOS image sensor. The housing 310 is fixed to a plate-like base portion 311 via an attachment portion 340. The base portion 311 is a member which is to be attached to the robot hand 202. The base portion 311 is provided with positioning pins 321 and 322, and tapered portions 331 and 332, as an attaching and detaching mechanism to/from the robot hand 202. The positioning pins 321 and 322, and the tapered portions 331 and 332 serve as engagement portions.

As illustrated in FIG. 3C, the cameras 301 and 302 are disposed symmetrically to each other, each tilted by a convergence angle α with respect to a symmetry plane A-A of these optical systems. Providing the convergence angle α allows the stereo camera 300 to have a wide common field of view, together with a relatively short working distance. The bottom face of the base portion 311 is orthogonal to the symmetry plane A-A. In addition, the positioning pins 321 and 322, and the tapered portions 331 and 332 are also disposed so as to be symmetrical with respect to the symmetry plane A-A.

Camera parameters for the stereo camera 300 have been measured in advance through a stereo camera calibration. Specifically, camera internal parameters have been measured for the cameras 301 and 302. One of the camera internal parameters indicates a relationship between a pixel coordinate value, expressed in units of pixels, of an image captured by the camera 301 and a line-of-sight vector in a three-dimensional space; the other of the camera internal parameters indicates a relationship between a pixel coordinate value, expressed in units of pixels, of an image captured by the camera 302 and the line-of-sight vector. In addition, a stereo camera external parameter has also been measured. The stereo camera external parameter indicates a relative position and orientation between the camera 301 and the camera 302. That is, there has been calculated a coordinate transformation matrix which indicates a relative position and orientation between a sensor coordinate system V1, which represents a position and orientation of the camera 301, and a sensor coordinate system V2, which represents a position and orientation of the camera 302. The sensor coordinate system V1 has the origin which is the lens principal point of the camera 301, and the sensor coordinate system V2 has the origin which is the lens principal point of the camera 302. The stereo camera calibration can be performed by using any of various known methods.

The CPU 601 extracts feature points from image data captured by the camera 301 and image data captured by the camera 302, and thereby can determine three-dimensional coordinate values of the feature points with respect to the sensor coordinate system. In the first embodiment, the camera 301 is a reference camera. Thus, in the first embodiment, the sensor coordinate system V1, which is of the sensor coordinate systems V1 and V2 of the sensor portion 305, is a sensor coordinate system V which is a first coordinate system, and which is used for the sensor portion 305, as a representative. Thus, results of the stereo measurement are expressed by coordinate values obtained with respect to the sensor coordinate system V of the camera 301. The position and orientation of feature points with respect to the sensor coordinate system V can be three-dimensionally measured with high accuracy by using a known stereo camera calibration method, but cannot be measured directly from the outside. Thus, in the first embodiment, calibration between base and camera is also performed to determine the position and orientation of the sensor coordinate system V with respect to the base portion 311. The calibration data obtained from the calibration between base and camera is stored in the HDD 604, which is a memory used for the sensor control device 600.

Figure 4A:
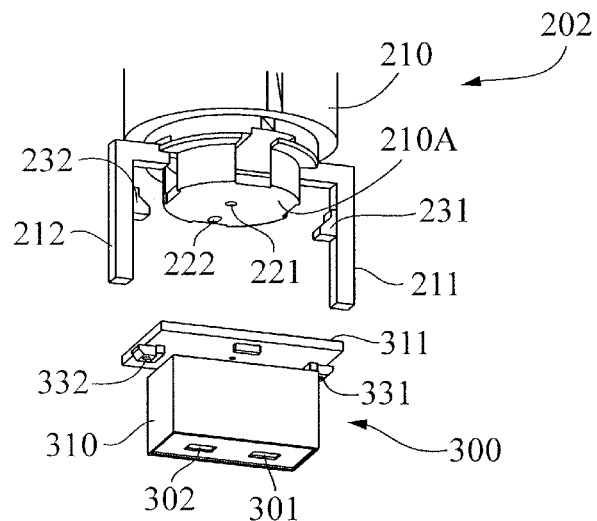
FIG. 4A is a perspective view of a robot hand and the stereo camera of the first embodiment.
Figure 4B:
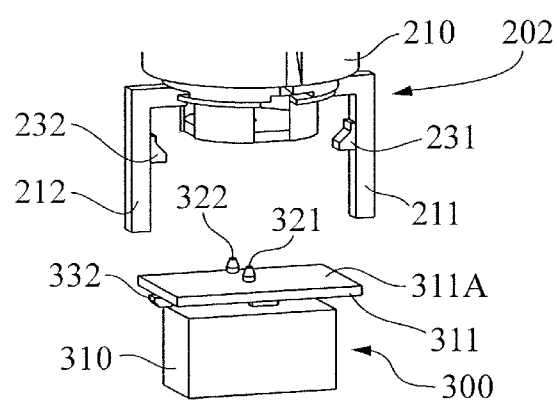
FIG. 4B is a perspective view of the robot hand and the stereo camera of the first embodiment.
Figure 4C:
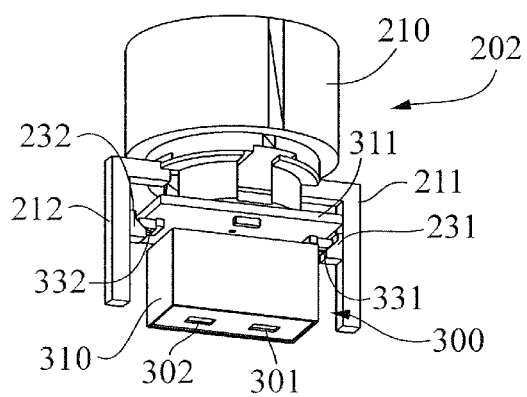
FIG. 4C is a perspective view of the robot hand and the stereo camera of the first embodiment.

FIGS. 4A, 4B, and 4C are perspective views of the robot hand 202 and the stereo camera 300 of the first embodiment. FIGS. 4A and 4B illustrate a state where the stereo camera 300 is released by the robot hand 202. FIG. 4C illustrates a state where the stereo camera 300 is held by the robot hand 202.

A flat surface 210A of a palm unit 210 of the robot hand 202 is provided with a round hole 221 and an elongated hole 222 at positions corresponding to the positioning pins 321 and 322 of the stereo camera 300. The round hole 221 and the elongated hole 222 serve as an engagement portion. The flat surface 210A of the palm unit 210 of the robot hand 202, the round hole 221, and the elongated hole 222 are mechanical references of the robot hand 202, and the fingers 211 and 212 are mounted within a predetermined tolerance with respect to the mechanical references. Specifically, in a state where a finger adjustment jig (not illustrated) is positioned with respect to the palm unit 210 by using the flat surface 210A of the palm unit 210, the round hole 221, and the elongated hole 222, the installation positions of the fingers 211 and 212 in an opening and closing direction of the fingers 211 and 212 are adjusted with respect to the finger adjustment jig (not illustrated). The dimension between the fingers 211 and 212 in the opening and closing direction can be adjusted by attaching shims, having different thicknesses, to an opening and closing mechanism (not illustrated) so as to sandwich the fingers. In this manner, the fingers 211 and 212 are adjusted with respect to the palm unit 210. When the base portion 311 for the stereo camera 300 is pressed against the palm unit 210 of the robot hand 202, the surface 210A of the palm unit 210 and the surface 311A of the base portion 311 abut against each other, and the positioning pins 321 and 322 fit with the round hole 221 and the elongated hole 222, respectively. With the engagement between the positioning pins 321 and 322, which serves as the engagement portion of the stereo camera 300, and the holes 221 and 222, which serve as the engagement portion of the robot hand 202, the stereo camera 300 can be positioned with respect to the robot hand 202 with high accuracy. Inside the fingers 211 and 212, tapered portions 231 and 232 are disposed. When the fingers 211 and 212 are closed in a state where the base portion 311 is pressed against the palm unit 210, the tapered portions 231 and 232 of the robot hand 202 engage with the tapered portions 331 and 332 of the stereo camera 300, respectively. The tapered portions 231 and 232, and 331 and 332 produce a force which presses the base portion 311 against the palm unit 210, so that the stereo camera 300 can be stably fixed to the robot hand 202. Thus, the attaching and detaching mechanism is configured to directly attach the stereo camera 300 to the robot hand 202.

With the above-described configuration, the stereo camera 300 can be attached to or detached from the robot hand 202 by only closing or opening the fingers 211 and 212 of the robot hand 202. In addition, the stereo camera 300 can be positioned with respect to the robot hand 202 with high accuracy, by only causing the robot hand 202 to hold the stereo camera 300. In addition, the stereo camera 300 is directly attached to the round hole 221 and the elongated hole 222, which are mechanical references of the robot hand 202. Thus, when the teaching work is performed, this configuration reduces influence caused by an error of the robot arm 201, and an error produced in production of a portion of the robot hand 202 between a palm unit 210 and a flange surface. The flange surface is the leading end of the robot arm 201. As a result, the teaching work can be performed with high accuracy.

The stereo camera 300 is pressed against the palm unit 210 of the robot hand 202 via the tapered portion 331 and 332. With this configuration, the teaching can be steadily performed without the robot hand 202 loosening its grip even when the posture of the robot hand 202 changes. In addition, the symmetry plane A-A of the optical systems of the stereo camera 300 coincides with a symmetry plane of the positioning pins 321 and 322, and with a symmetry plane of the tapered portions 331 and 332. With such an arrangement, even when the base portion 311 is distorted because the tapered portions 331 and 332 are pushed toward the palm unit 210 by the tapered portions 231 and 232, the influence by the distortion is caused symmetrically. This prevents the error from easily occurring during the teaching. In addition, the housing 310 and the base portion 311 are formed of members different from each other, and joined with each other via the attachment portion 340. With such a configuration, even when the base portion 311 is distorted as described above, the relative position and orientation between the camera 301 and the camera 302 of the stereo camera 300 hardly changes. In general, a slight change in relative position and orientation between a pair of cameras of a stereo camera causes a measured value, obtained by the stereo camera, to have a large error. However, the configuration of the stereo camera 300 of the first embodiment produces less error than a configuration in which the robot hand 202 directly holds the housing 310. Thus, the error in the teaching can be reduced even though the stereo camera 300 is designed so as to be light in weight, that is, to have a low stiffness. In addition, an air gap is created, as a heat insulation layer, between the housing 310 and the base portion 311. This can prevent heat, produced in the robot hand 202, from being easily transmitted to the housing 310, thus reducing the error caused by thermal deformation of the stereo camera 300. Furthermore, in a case where the design of the robot hand 202 is changed, or where the stereo camera 300 is to be attached to another robot, the identical stereo camera 300 can be used by changing the design of the base portion 311.

Figure 5:
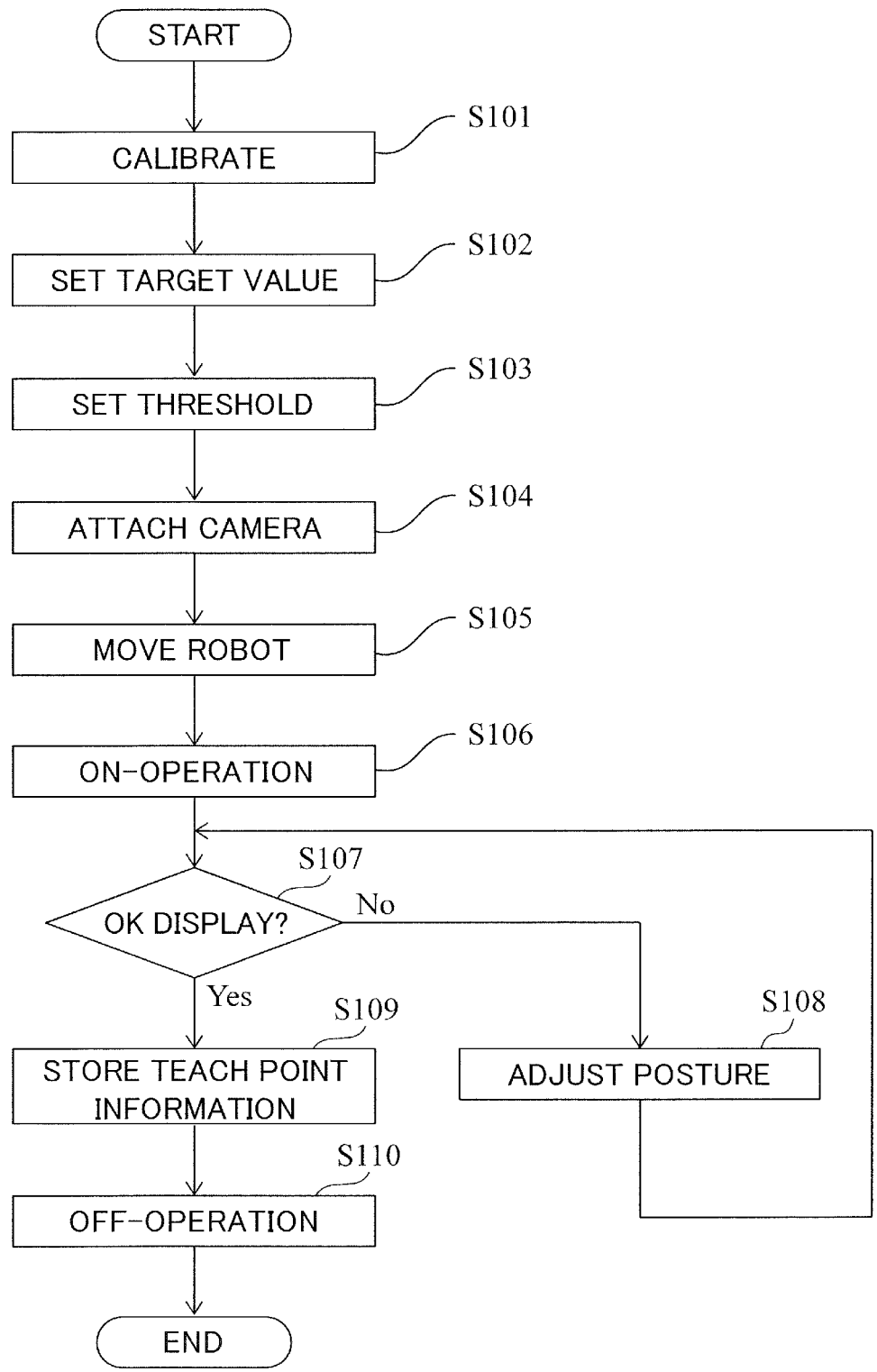
FIG. 5 is a flowchart illustrating a method of teaching a robot, according to the first embodiment.
Figure 6:
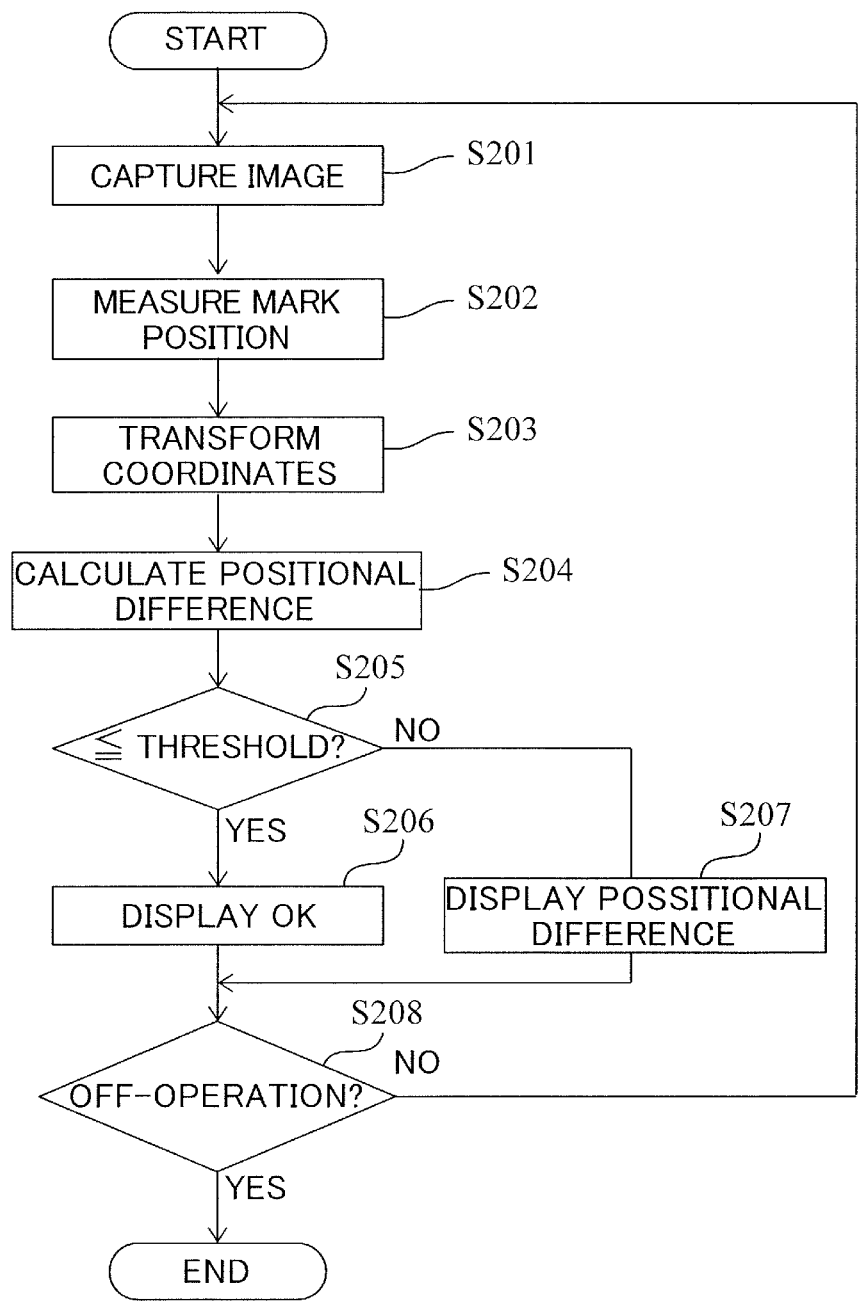
FIG. 6 is a flowchart illustrating a method of teaching the robot, according to the first embodiment.

FIGS. 5 and 6 are flowcharts illustrating a method of teaching the robot 200, according to the first embodiment. Here, the flowcharts of FIGS. 5 and 6 include user operations in addition to the processing performed by the CPUs 501 and 601. In FIG. 5, the process first calibrates the relative relationship between a base coordinate system B and the sensor coordinate system V (S101: calibration step). The base coordinate system B is a second coordinate system, and has its reference which is at the engagement portion of the stereo camera 300, used to attach the stereo camera 300 to the robot 200. In the first embodiment, the origin of the base coordinate system B is at one of the positioning pins 321 and 322 of the base portion 311 of the stereo camera 300. The positioning pins 321 and 322 are the engagement portion. As an example, the origin is set at a base portion of the positioning pin 321.

The calibration of the relative relationship between the sensor portion 305 of the stereo camera 300 and the positioning pin 321, that is, the calibration of the relative relationship between the sensor coordinate system V and the base coordinate system B is performed in a state where the stereo camera 300 is removed from the robot 200, and is set on a calibration jig. The position and orientation of feature points with respect to the sensor coordinate system V can be three-dimensionally measured with high accuracy. However, the sensor coordinate system V is a coordinate system whose origin is at the lens principal point of the camera 301. In the first embodiment, the CPU 601 performs the calibration to identify the relative position and orientation between the base coordinate system B and the sensor coordinate system V, and causes the HDD 604 to store the calibration data. Hereinafter, the method of the calibration will be specifically described.

Figure 7A:
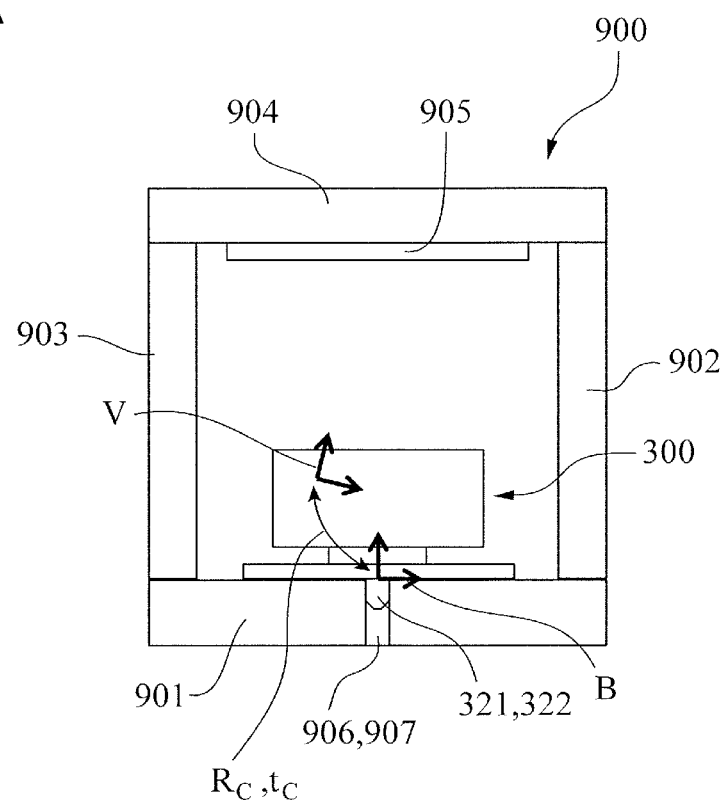
FIG. 7A is an explanatory diagram of a calibration jig of the first embodiment.

FIG. 7A is an explanatory diagram of a calibration jig 900 used for the calibration. The calibration jig 900 includes a base portion 901, pillar portions 902 and 903, a top plate portion 904, and a reference pattern portion 905 which is a reference object. The base portion 901 and the top plate portion 904 are plate-like members which are disposed facing each other, and joined with each other via the pillar portions 902 and 903. The base portion 901 is provided with holes 906 and 907 at positions corresponding to the pins 321 and 322 of the stereo camera 300, as is the round hole 221 and the elongated hole 222 of the palm unit 210. With this structure, the stereo camera 300 can be positioned with respect to the reference pattern portion 905 with high reproducibility. When the stereo camera 300 is set on the calibration jig 900, the field of view of the stereo camera 300 contains the reference pattern portion 905.

Figure 7B:
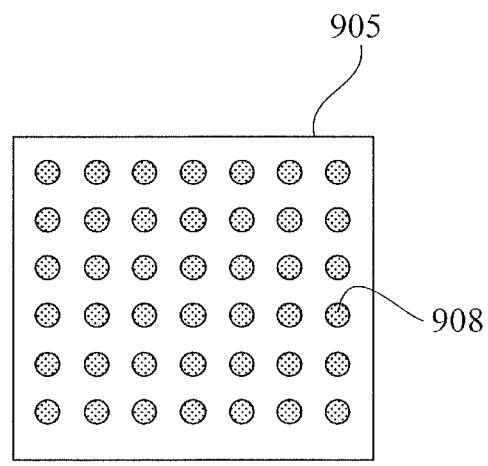
FIG. 7B is a plan view of a reference pattern portion of the first embodiment.

FIG. 7B is a plan view of the reference pattern portion 905. The reference pattern portion 905 is disposed on the inner surface of the top plate portion 904. The reference pattern portion 905 is a plate-like member. On the surface of the reference pattern portion 905, N number of marks 908, which are made with high accuracy through an etching process or the like, are formed like an array. Positions of the top face of the base portion 901, the holes 906 and 907, and the marks 908 of the reference pattern portion 905 are measured with a measuring instrument (not illustrated), with high accuracy, after the calibration jig 900 is made. Furthermore, the base coordinate system B is set with respect to the measured values of the top face of the base portion 901 and the holes 906 and 907. Three-dimensional coordinate values m[i] (i=1 to N) of the marks 908 have been coordinate-transformed to three-dimensional coordinate values $^B$m[i] (i=1 to N) with respect to the base coordinate system B, and the coordinate-transformed three-dimensional coordinate values $^B$m[i] (i=1 to N) are stored in the HDD 604. The CPU 601 calibrates the relative relationship between the base coordinate system B and the sensor coordinate system V by measuring the marks 908 of the reference pattern portion 905 in stereo, in a state where the stereo camera 300 is positioned with respect to the calibration jig 900.

In the first embodiment, the CPU 601 determines a rotation matrix $R_C$, which is a coordinate transformation matrix, and a translation vector $t_C$, as the relative relationship between the base coordinate system B and the sensor coordinate system V. If coordinate values $^V$m[i] (i=1 to N) of the marks 908 with respect to the sensor coordinate system V, obtained when the marks 908 are measured in stereo, have no errors, the following expression (1) holds.

$$^B m[i] = R_C \cdot {}^V m[i] + t_C \ (i=1,2,3,\ldots,N) \tag{1}$$

However, since actual measurement data has errors, the left side and the right side of the expression (1) are not exactly equal to each other. Thus, the CPU 601 determines the rotation matrix $R_C$ and the translation vector $t_C$ which minimize the following expression (2). That is, the CPU 601 determines least squares solutions of the following expression (2).

$$\sum_{i=1}^{N} |{}^B m[i] - (R_C \cdot {}^V m[i] + t_C)|^2 \tag{2}$$

This problem is known as the matching problem between point sets, and can be solved by using, for example, an approach which uses singular value decomposition. By using the above method, the rotation matrix $R_C$ and the translation vector $t_C$, which are the relative relationship between the sensor coordinate system V and the base coordinate system B, can be calibrated with high accuracy. The HDD 604 of the sensor control device 600 stores data of the rotation matrix $R_C$ and the translation vector $t_C$, calibrated in this manner.

A user then sets target coordinate values for the teaching (S102). In the first embodiment, the user sets the target coordinate values at which the workpiece W2 is positioned at the position PA, as illustrated in FIG. 2B. The setting of the target values is performed by inputting a positional relationship in design between the mechanical references of the stereo camera 300, such as the surface of the base portion 311 and the positioning pins 321 and 322, and the marks MK1 to MK3 provided to the workpiece holding jig 400. That is, the user sets target values $^B$p[i] (i=1 to 3) of three-dimensional coordinates of the marks MK1 to MK3, in design, with respect to the base coordinate system B. Here, the target values $^B$p[i] (i=1 to 3) are three-dimensional coordinate values, each expressed by a vector having three components of XYZ. The target values $^B$p[i] may be set by the user selecting the target values $^B$p[i] from a list of target values, which is stored in advance in the HDD 604 of the sensor control device 600, or may be set by the user operating the input device 850 and inputting numerical values into the input device 850. In the case where a user uses the input device 850 to input numerical value, a marker coordinate system M representing a position and orientation of the marks MK1 to MK3 may be introduced to more simplify the input operation. In this case, the user inputs three-dimensional coordinate values $^M$p[i] (i=1 to 3) of the marks MK1 to MK3 with respect to the marker coordinate system M, and design values of a relative position and orientation of the marker coordinate system M with respect to the base coordinate system B. Where the design values are expressed by a rotation component of $^B R_M$ and a translation component of $^B t_M$, the three-dimensional coordinate values $^B$p[i] (i=1 to 3) of the marks MK1 to MK3 are expressed by the following expression (3).

$$^B p[i] = {}^B R_M {}^M p[i] + {}^B t_M \ (i=1,2,3) \tag{3}$$

With the input operation performed in the marker coordinate system M, the arrangement determined by only a shape of the marks MK1 to MK3 and a position and orientation of the robot hand 202 with respect to the marker coordinate system M can be set separately. This simplifies the setting when the number of the marks is large. Thus, Step S102 causes the HDD 604 of the sensor control device 600 to store the target values $^B p[i]$ of the marks MK1 to MK3 with respect to the base coordinate system B.

The user then sets a threshold δ to the sensor control device 600 (S103). The threshold δ is used for a later-described convergence determination. The user can freely set the thresholds δ in consideration of accuracy required for an intended use. Thus, Step S103 causes the HDD 604 of the sensor control device 600 to store the threshold δ.

Then the stereo camera 300 is attached to the robot 200 (S104: attachment step). Specifically, the user causes the robot hand 202 to hold the stereo camera 300. For example, the user performs jog feed of the robot arm 201 by operating the teaching pendant 800 so that the palm unit 210 of the robot hand 202 faces upward, and then places the stereo camera 300 on the flat surface 210A, which is a palm of the palm unit 210. The user then operates the teaching pendant 800, and causes the fingers 211 and 212 of the robot hand 202 to close to chuck the stereo camera 300. The stereo camera 300 is held by the robot hand 202, and thereby positioned with respect to the robot hand 202 with high accuracy. Thus, the base coordinate system B is positioned with respect to the robot hand 202 with high accuracy.

Then, the CPU 501 and the CPU 601 work with each other to refer to the relative relationship $R_C$ and $t_C$, which is calibrated and stored in the HDD 604, and to teach the robot 200 by using the stereo camera 300 (S105 to S109, and S201 to S208). Hereinafter, this teaching step will be specifically described. The CPU 501 moves the robot 200, that is, the robot arm 201 so as to take a posture in which the teaching is started (S105). That is, the CPU 501 moves the stereo camera 300 to a position at which the teaching is started. The posture of the robot 200 in which the teaching is started is a posture in which the field of view of the stereo camera 300 contains the workpiece holding jig 400, which is a measured object. That is, the robot 200, that is, the robot arm 201 may take any posture as long as the stereo camera 300 can capture images of the marks MK1 to MK3 of the workpiece holding jig 400. In this case, the CPU 501 may move the robot 200 depending on a command obtained when the user operates the teaching pendant 800, or may move the robot 200 so as to take a posture which has been set in advance by an off-line teaching or the like. After moving the robot 200 to the teach point, if the marks MK1 to MK3 are positioned outside the field of view of the stereo camera 300, the user can perform jog feed of the robot arm 201 while checking the image from the stereo camera 300 on the display 700. Step 105 allows the field of view of the stereo camera 300 to contain the three marks MK1 to MK3.

If the user performs an on-operation by using the input device (S106), the CPU 601 of the sensor control device 600 repeats processes illustrated in FIG. 6, until the user performs an off-operation by using the input device 850. The on-operation and the off-operation may be performed by the user moving a cursor to a corresponding key of a software keyboard displayed on the display 700 and clicking the key by using a mouse or the like, or pressing a corresponding button of the input device 850.

Hereinafter, repetitive processes performed when the on-operation is performed will be described. The CPU 601 sends an imaging command to the stereo camera 300, causes the stereo camera 300 to capture images of the workpiece holding jig 400 in which the marks MK1 to MK3 are contained, and obtains the images from the stereo camera 300 (S201). Thus, the CPU 601 obtains the images (stereo images) from both the camera 301 and the camera 302. That is, the CPU 601 obtains visual information from the stereo camera 300.

The CPU 601 then performs image processing and a stereo calculation process on the obtained stereo images, and measures positions of the marks MK1 to MK3 (S202). The image processing for measuring the positions of the marks MK1 to MK3 can use a variety of known methods. For example, the image processing performs an edge extraction process on each of the stereo images, and uses shape feature values, such as circularity or circumradius of the extracted edge, to select only the edges of the marks MK1 to MK3. Then, the image processing performs an ellipse fitting process on the edges of the marks MK1 to MK3 of the images, and determines pixel coordinates of the center points of the marks MK1 to MK3. Here, not the circle fitting process but the ellipse fitting process is used, because the circular marks MK1 to MK3 can be deformed and have an ellipse-like shape when images of the marks are captured due to the relative arrangement of the stereo camera 300 and the marks MK1 to MK3. After determining the pixel coordinates of the center points of the circles of the marks MK1 to MK3, the image processing associates the pixel coordinates of the image captured by the camera 301, with the pixel coordinates of the image captured by the camera 302, and calculates three-dimensional coordinate values. The image processing can calculate the coordinate values of the marks MK1 to MK3 with respect to the sensor coordinate system V, by using the camera internal parameters and the camera external parameter of the cameras 301 and 302. The coordinate values are expressed as $^V q[i]$ (i=1 to 3). Thus, the CPU 601 extracts feature points contained in the visual information, which is obtained from the stereo camera 300.

The CPU 601 then refers to the rotation matrix $R_C$ and the translation vector $t_C$ stored in the HDD 604, and coordinate-transforms the coordinate values $^V q[i]$ (i=1 to 3) of the marks MK1 to MK3 to measured values $^B q[i]$ (i=1 to 3) with respect to the base coordinate system B (S203). That is, the CPU 601 determines the measured values $^B q[i]$ (i=1 to 3) by using the following expression (4), as a result of the measurement using the stereo camera 300.

$$^B q[i] = R_C \cdot {}^V q[i] + t_C \quad (i=1,2,3) \qquad (4)$$

The CPU 601 then uses the measured values $^B q[i]$ (i=1 to 3) with respect to the base coordinate system B, to which the coordinate values has been coordinate-transformed, and target values $^B p[i]$ (i=1 to 3), and computes the amount of positional difference between the measured values and the target values (S204). The comparison between the coordinate values $^B p[i]$ and $^B q[i]$ is easy, because the coordinate values $^B p[i]$ and $^B q[i]$ are coordinate values with respect to the base coordinate system B, obtained through the coordinate transformation. The CPU 601 uses an expression (5), and computes difference vectors Δp[i] (i=1 to 3) between the target values $^B p[i]$ and the measured values $^B q[i]$.

$$\Delta p[i] = {}^B q[i] - {}^B p[i] \quad (i=1,2,3) \qquad (5)$$

In addition, the CPU 601 also computes the amount of shift of the base coordinate system B, as another index for the amount of positional difference. Where a coordinate system B' is a coordinate system obtained after the base coordinate system B moves by a rotation matrix R and a translation vector t, target values $^B\text{p}'[i]$ obtained after the base coordinate system B moves are expressed as the following expression (6).

$$^Bp'[i]=R\cdot{}^Bp[i]+t \quad (i=1,2,3) \tag{6}$$

Thus, in order to shift the base coordinate system B so that the target values $^B\text{p}'[i]$ obtained after the base coordinate system B is shifted are equal to the measured values $^B\text{q}[i]$ of the marks MK1 to MK3, least squares solutions of the rotation matrix R and the translation vector t are determined so that the following expression (7) has the minimum value. That is, because the measured values $^B\text{q}[i]$ of the marks MK1 to MK3 have measurement errors which depend on the stereo camera 300 and the individual difference of the marks MK1 to MK3 and which differs from each other, the least squares solutions of the rotation matrix R and the translation vector t are determined. Here, N is the number of the marks which are the feature points, and i is an integer from 1 to N. That is, the CPU 601 determines the rotation matrix R and the translation vector t so that the expression (7) has the minimum value.

$$\sum_{i=1}^{N}|^Bq[i]-(R\cdot{}^Bp[i]+t)|^2 \tag{7}$$

Figure 8:
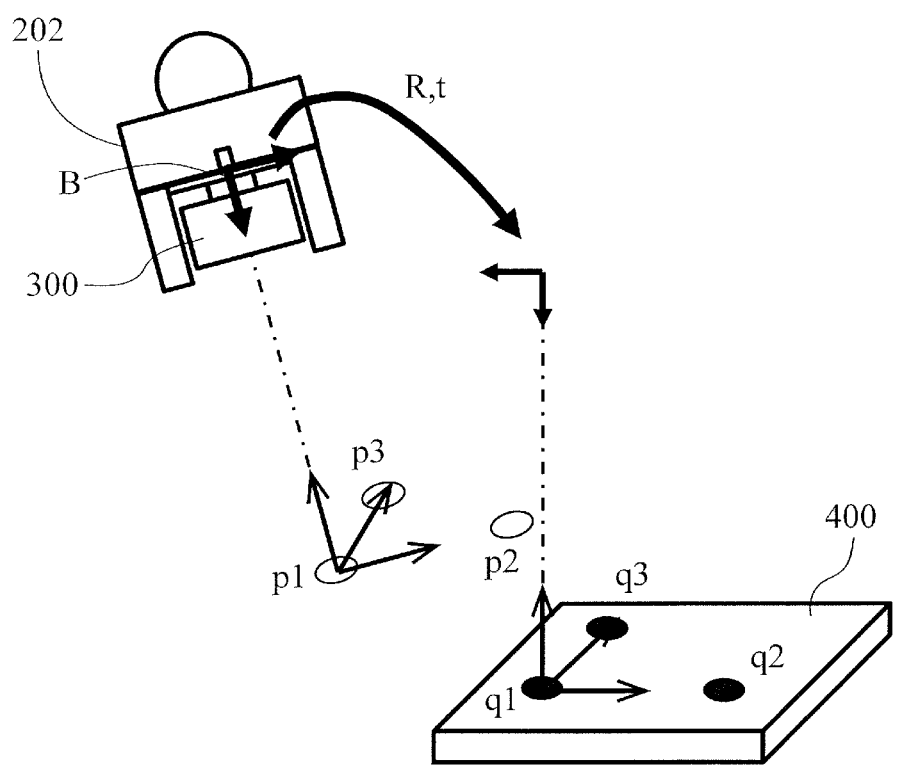
FIG. 8 is a schematic diagram for illustrating a relationship between target values and measured values of feature points.

This computation can be performed by using the same method as that used for the calibration between base and camera, and that used for the matching problem between point sets. With the above-described computing process, there is determined the rotation matrix R and the translation vector t which indicate the positional difference of the base coordinate system B. FIG. 8 is a schematic diagram for illustrating a relationship between the target values $^B\text{p}[i]$ of the feature points and the measured values $^B\text{q}[i]$ of the feature points. In FIG. 8, the target values $^B\text{p}[i]$ (i=1 to 3) are expressed as p1, p2, and p3, and the measured values $^B\text{q}[i]$ (i=1 to 3) are expressed as q1, q2, and q3. The CPU 601 determines the rotation matrix R and the translation vector t, used to perform a coordinate transformation so that the target coordinate values p1, p2, and p3 completely overlap with the measured coordinate values q1, q2, and q3.

The CPU 601 then compares the amount of positional difference determined in Step S204, with a threshold δ (Step S205). That is, the CPU 601 determines whether the amount of positional difference is equal to or smaller than the threshold. In the first embodiment, the CPU 601 determines, as the amount of positional difference, norms |Δp[i]| of the difference vectors Δp[i] and a norm |t| of the translation vector t. The CPU 601 then compares the largest value in |Δp[i]| and |t|, with the threshold δ. Specifically, the CPU 601 determines whether the following expression (8) is satisfied.

$$\max\left(\max_{i=(1,2,3)}|\Delta p[i]|,|t|\right)\leq\delta \tag{8}$$

By using such indexes, the teaching can be performed so that both the amount of positional difference of the marks MK1 to MK3 and the amount of positional difference of the base portion 311 are within a desired precision range. Thus, the teaching can be performed also in consideration of the tilt of the stereo camera 300 with respect to the marks MK1 to MK3. The above-described threshold determination method is merely one example, and thus any other method may be used to perform the determination, by using another index based on the amount of positional difference. For example, only the amount of positional difference Δp[i] of positional coordinates of the marks MK1 to MK3 may be used for the threshold determination, or only the amount of positional difference determined by the rotation matrix R and the translation vector t may be used for the threshold determination.

As a result of the determination in Step S205, if the amount of positional difference is equal to or smaller than the threshold (S205: Yes), then the CPU 601 causes the display 700 to display "OK" (S206). If the amount of positional difference exceeds the threshold (S205: No), the CPU 601 causes the display 700 to display, for example, the amount and direction of the computed positional difference (S207). In this manner, the CPU 601 causes the display 700 to indicate information on the positional differences to a user. The CPU 601 may cause the display 700 to display a captured image and superimpose an arrow, which indicates a required direction and amount of motion of the robot arm 201, on the displayed image. In addition, the CPU 601 may cause the display 700 to display, for example, the translation vector t and the rotation matrix R computed in Step S204. In this case, not the mark positions but the amount of motion of the palm unit 210 of the robot hand 202 is displayed. The amount of motion is a converted amount between positions of the palm unit 210. This allows a user to intuitively understand the amount of motion. As another approach for indicating information on the amount of positional difference to a user, blink of a lamp or sound from a speaker may be used as well as the display on the display 700.

After causing the display 700 to display a corresponding display, the CPU 601 determines whether the off-operation is performed by a user (S208). If the off-operation is performed (S208: Yes), then the CPU 601 ends the process. If the off-operation is not performed (S208: No), the CPU 601 repeats the steps S201 to S207 until the off-operation is performed.

While the CPU 601 of the sensor control device 600 performs the process illustrated in FIG. 6, the user checks the display on the display (S107). That is, the user checks whether the display 700 displays "OK".

If the display 700 does not display "OK" (S107: No), the user operates the teaching pendant 800 and adjusts the posture of the robot 200, that is, the robot arm 201 (S108). That is, the CPU 501 adjusts the posture of the robot 200, that is, the robot arm 201, depending on a command from the teaching pendant 800 operated by the user. While the user moves the robot 200 by using the teaching pendant 800, the CPU 601 is performing the process illustrated in FIG. 6. Thus, the CPU 601 updates the display on the display 700, in real time.

As a result of the adjustment of the posture of the robot 200, if the amount of positional difference becomes equal to or smaller than the threshold δ and the display 700 displays "OK" (S107: Yes), the user causes the HDD 504 to store the posture of the adjusted robot 200, as a teach point (S109). In Step S109, the user may cause the HDD 504 to store the teach point data, by pressing a button of the teaching pendant 800. After teaching the robot 200, the user performs the off-operation by using the input device 850 (S110).

The teach point data corresponds to joint angles of joints of the robot arm 201, that is, the data is angle command values for rotation angles of motors of the joints. For example, in a case where the robot arm 201 has six joints, one piece of teach point data includes six angle command values. The teach point data may include six command values indicating a position and orientation of the leading end of the robot arm 201, with respect to the robot coordinate system O. The six command values are obtained by converting six angle command values by using a calculation which is based on forward kinematics. In this case, when the robot arm 201 is moved in accordance with the teach point, there is required an operation which converts the teach point data to the angle command values by using a calculation which is based on inverse kinematics.

As described above, in the first embodiment, the calibration is not performed in a state where the stereo camera 300 is attached to the robot hand 202. Instead, the calibration is performed, in Step S101, in the state where the stereo camera 300 is detached from the robot hand 202. More specifically, the base coordinate system B is defined with respect to a portion of the positioning pins 321 and 322, which are the mechanical reference used when the stereo camera 300 is attached to the robot hand 202; and the calibration is performed by using the calibration jig 900, with respect to the base coordinate system B. Thus, when the calibration is performed, any error in posture of the robot 200 is not included in the calibration result. In general, because joints and links of the robot arm 201 are distorted depending on its posture and the robot arm 201 has an error produced in its production, there is an error in position and orientation of the hand of the robot 200. The robot hand 202 also has an error produced in its production. If calibration is performed in a state where the stereo camera 300 is attached to the robot 200, an error in position and orientation of the stereo camera 300 attached to the hand of the robot 200 significantly affects the calibration result, reducing accuracy of the relative relationship $R_C$ and $t_C$, which serves as calibration data. In contrast, the first embodiment, which performs the calibration in the state where the stereo camera 300 is removed from the robot 200, can prevent the error in posture of the robot 200 from affecting the relative relationship $R_C$ and $t_C$. Thus, the accuracy of the relative relationship $R_C$ and $t_C$ is increased, and as a result, the robot 200 can be taught with high accuracy.

Since the above-described calibration result is highly accurate, the relative positional relationship (measured values $^Bq[i]$) between the marks MK1 to MK3 and the base coordinate system B can be correctly measured. In other words, the position and orientation of the base coordinate system B with respect to the workpiece holding jig 400 can be correctly determined. As a result, the amount of positional difference of the base coordinate system B with respect to the target values $^Bp[i]$, which is numerically set with respect to the base coordinate system B, can be correctly computed in Step S204 without affected by an error of the robot 200.

Furthermore, the base coordinate system B coincides with the mechanical reference used when the stereo camera 300 is attached to the robot hand 202. Thus, the base coordinate system B can be positioned with respect to the robot hand 202 with high accuracy, by attaching the stereo camera 300 to the robot hand 202. As a result, the teaching can be performed in the state where the robot hand 202 is positioned with respect to the workpiece holding jig 400 with high accuracy. In this manner, the use of the numerically-specified target values $^Bp[i]$ enables teaching the robot 200 without any prepared reference image, thus increasing workability of the teaching.

Figure 9A:
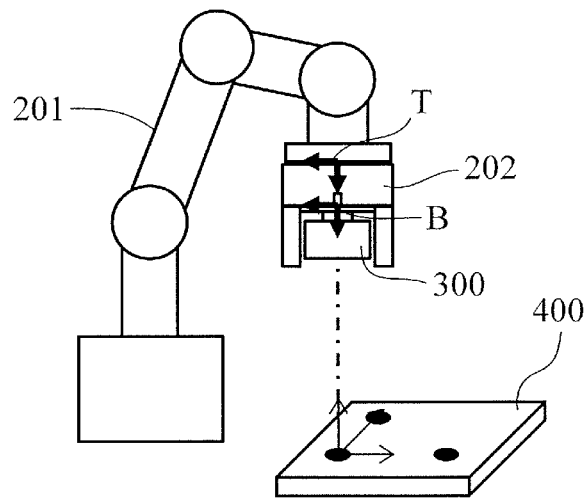
FIG. 9A is an explanatory diagram illustrating a relationship between a tool coordinate system positioned at a leading end of a robot arm and a base coordinate system of the stereo camera.
Figure 9B:
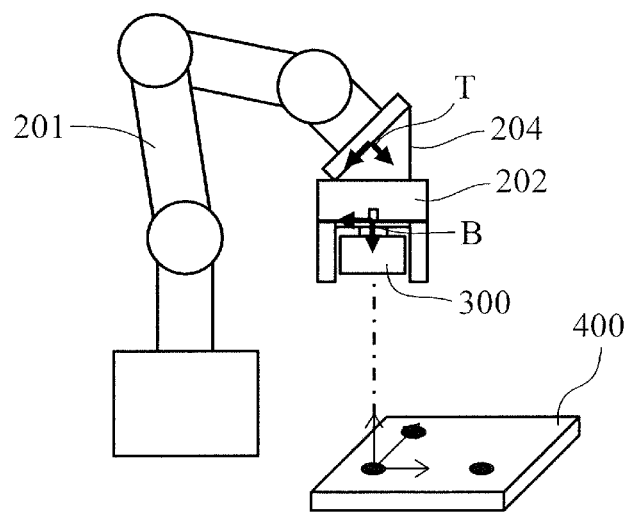
FIG. 9B is an explanatory diagram illustrating a relationship between a tool coordinate system positioned at the leading end of the robot arm and the base coordinate system of the stereo camera.

FIGS. 9A and 9B are explanatory diagrams illustrating a relationship between a tool coordinate system T positioned at a leading end of the robot arm 201 and the base coordinate system B of the stereo camera 300. FIGS. 9A and 9B are different in the position and orientation of the robot hand 202 with respect to the robot arm 201. That is, FIG. 9A illustrates a configuration in which the robot hand 202 is directly attached to a flange surface of the robot arm 201, which is the leading end of the robot arm 201; FIG. 9B illustrates a configuration in which the robot hand 202 is attached to the flange surface of the robot arm 201 via an attaching jig 204. The tool coordinate system T is a coordinate system positioned at the flange surface of the robot arm 201.

In the first embodiment, the teaching is performed by using the target values $^Bp[i]$ of the marks MK1 to MK3 of the workpiece holding jig 400 with respect to the base coordinate system B, not by using information on position and orientation of the robot hand 202 with respect to the robot arm 201. That is, the relationship between the tool coordinate system T and the base coordinate system B needs not to be determined. For this reason, the tool coordinate system T needs not to be newly set for the teaching. As a result, in an event such as changeover of production line, the first embodiment can be easily applied to even a case where the robot hand 202 is attached to the robot arm 201 in a different direction in such a manner that the state of FIG. 9A is changed to the state of FIG. 9B. That is, when the relative position and orientation of the workpiece holding jig 400 seen from the robot hand 202, to which the stereo camera 300 is attached, does not change, the robot 200 can be taught again without changing the setting of the target values $^Bp[i]$. Even in such a case, the robot 200 can be taught simply and with high accuracy.

Second Embodiment

Figure 10:
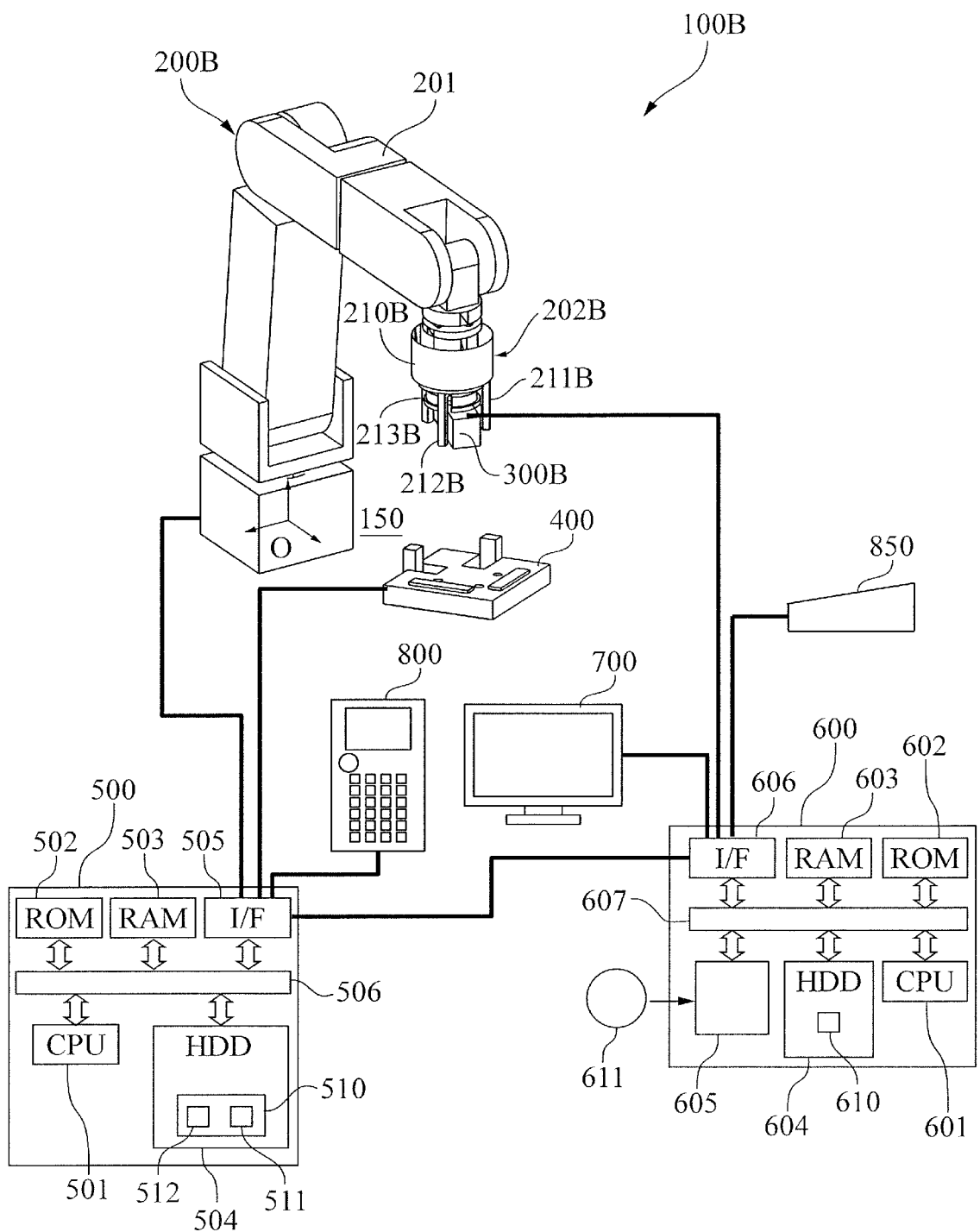
FIG. 10 is an explanatory diagram of a robot system of a second embodiment.

Next, a method of teaching a robot of a robot system according to a second embodiment will be described. FIG. 10 is an explanatory diagram of the robot system of the second embodiment. A robot system 100B includes a robot 200B, a stereo camera 300B which is one example of vision sensors, the workpiece holding jig 400, the robot control device 500, the sensor control device 600, and the display 700. The robot system 100B also includes the teaching pendant 800 and the input device 850, which are one example of operation devices.

The second embodiment has a configuration different from that of the first embodiment in the following points. In the first embodiment, the robot hand 202 of the robot 200 has two fingers; but in the second embodiment, the robot hand 202B of the robot 200B has three fingers. In addition, in the first embodiment, the description has been made for the case where the robot control device 500 and the sensor control device 600 are not connected with each other; but in the second embodiment, the robot control device 500 and the sensor control device 600 are electrically and communicatively connected with each other via a communication line. With this configuration, when the teaching is performed on the robot 200B, that is, on the robot arm 201, the teaching can be performed not by the jog feed through the operation of the teaching pendant 800 by a user, but by automatic motion of the robot 200B.

Figure 11A:
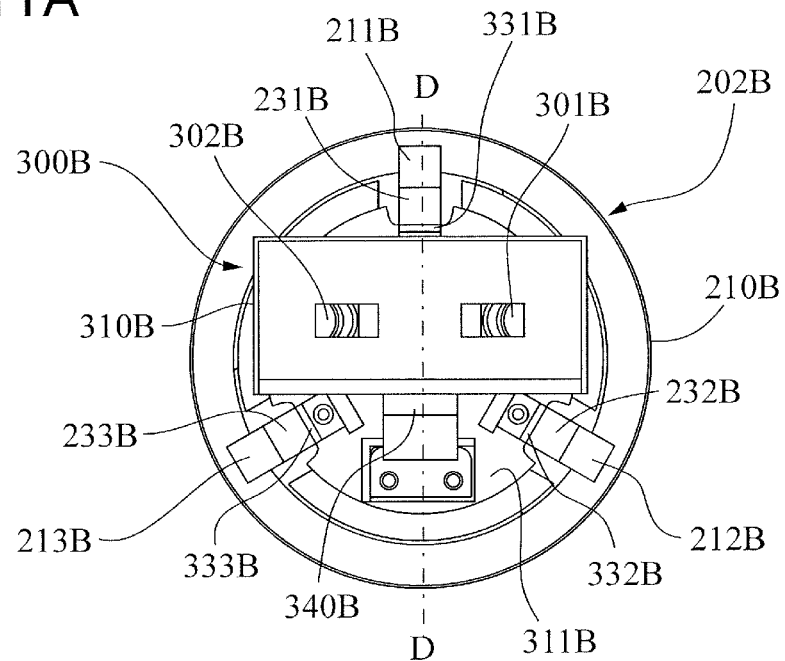
FIG. 11A is a front view illustrating a state where a stereo camera is held by a robot hand in the second embodiment.
Figure 11B:
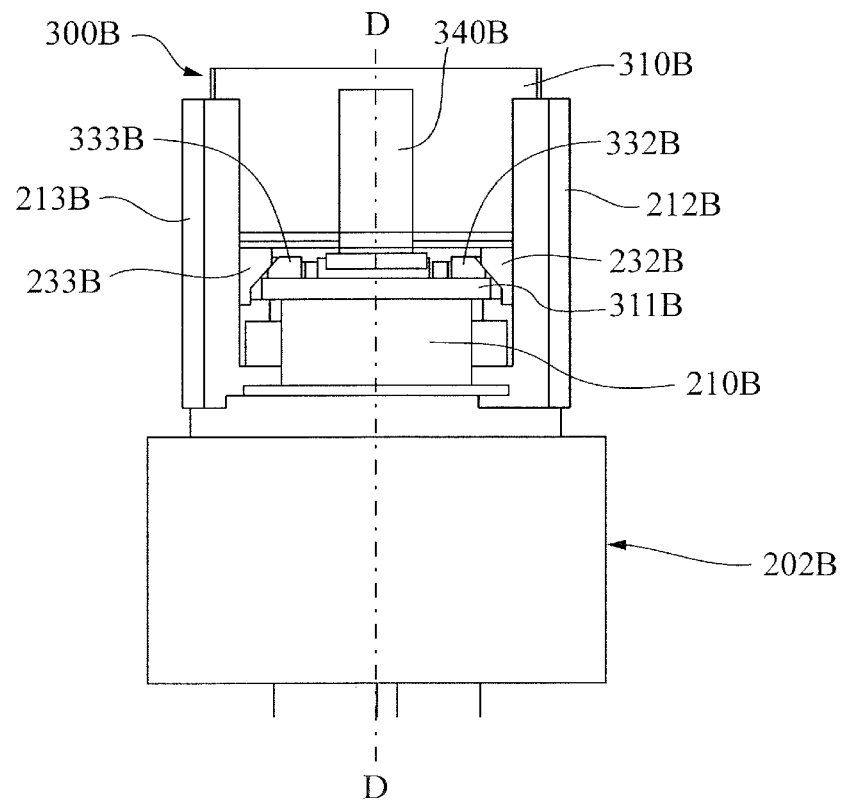
FIG. 11B is a side view illustrating the state where the stereo camera is held by the robot hand in the second embodiment.

FIG. 11A is a front view illustrating a state where the stereo camera 300B is held by the robot hand 202B in the second embodiment. FIG. 11B is a side view illustrating the state where the stereo camera 300B is held by the robot hand 202B in the second embodiment. The robot hand 202B is a three-finger robot hand which is suitable to hold a cylindrical workpiece for example. The robot hand 202B includes a palm unit 210B which is a hand body, and a plurality of fingers 211B, 212B, and 213B which can open and close with respect to the palm unit 210B. In the second embodiment, the number of the fingers is three. With these components, the robot hand 202B can hold or release a workpiece. The palm unit 210B includes a housing and a driving mechanism which is housed by the housing and configured to drive the fingers 211B, 212B, and 213B.

The stereo camera 300B includes a camera 301B which is a first camera, and a camera 302B which is a second camera. The two cameras, 301B and 302B, are disposed in the interior of a housing 310B. The cameras 301B and 302B are digital cameras having an imaging device, such as a CCD image sensor or a CMOS image sensor. The housing 310B is fixed to a plate-like base portion 311B via an attachment portion 340B. The base portion 311B is provided with tapered portions 331B, 332B, and 333B corresponding to the three-finger robot hand 202B. When the fingers 211B, 212B, and 213B are closed in a state where the base portion 311B is pressed against the palm unit 210B, tapered portions 231B, 232B, and 233B of the robot hand 202B engage with the tapered portions 331B, 332B, and 333B of the stereo camera 300B. With this operation, the stereo camera 300B can be chucked with respect to the robot hand 202B. As in the first embodiment, the palm unit 210B of the robot hand 202B is provided with the round hole 221 and the elongated hole 222 as illustrated in FIG. 4A. The round hole 221 and the elongated hole 222 serve as an engagement portion. As in the first embodiment, the base portion 311B of the stereo camera 300B is provided with the positioning pins 321 and 322 as illustrated in FIG. 4B. The positioning pins 321 and 322 serve as an engagement portion. The positioning pins 321 and 322 and the holes 221 and 222 are engaged with each other, that is, fit with each other by the robot hand 202B holding the stereo camera 303B, so that the stereo camera 300B is positioned with respect to the robot hand 202B with high accuracy.

In the second embodiment, even in the case where the robot hand 202B has three fingers, the symmetry plane of the stereo optical systems of the stereo camera 300B is the same as a symmetry plane of the positioning mechanisms of the stereo camera 300B which positions the stereo camera 300B with respect to the robot hand 202B. The symmetry plane is indicated as a plane D-D. Thus, the symmetry as described in the first embodiment produces the effect in which the error is prevented from easily occurring due to deformation such as distortion of the base portion 311B.

In the second embodiment, the interface 505 of the robot control device 500 and the interface 606 of the sensor control device 600 are connected with each other via a communication line. Thus, the CPU 501 and the CPU 601 can communicate with each other. In the second embodiment, the two CPUs, the CPU 501 and the CPU 601, function as a control unit.

Figure 12:
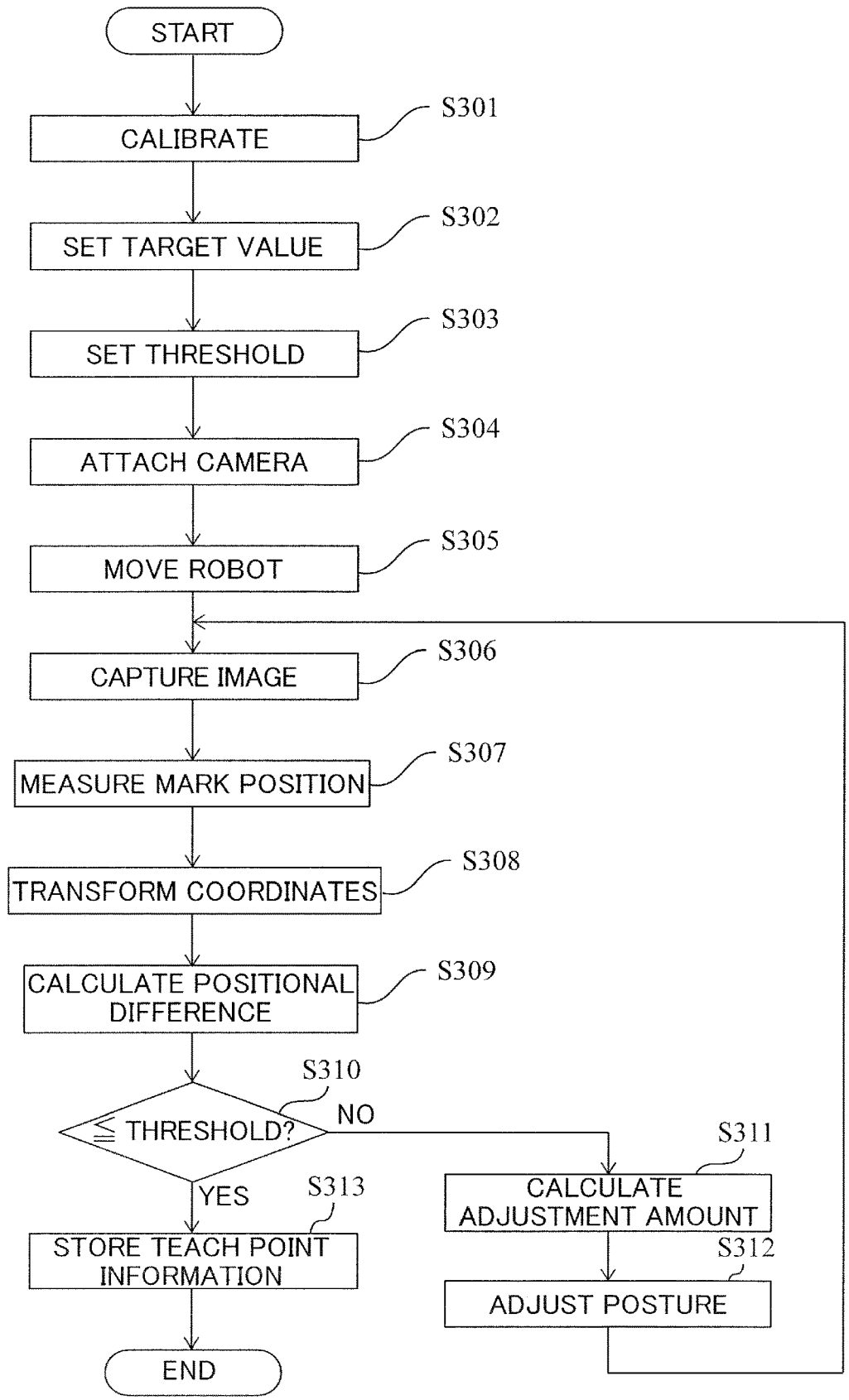
FIG. 12 is a flowchart illustrating a method of teaching a robot, according to the second embodiment.

FIG. 12 is a flowchart illustrating a method of teaching the robot 200B, according to the second embodiment. Here, the flowchart of FIG. 12 includes user operations in addition to the processing performed by the CPUs 501 and 601. In FIG. 12, the CPU 601 first calibrates the relative relationship between the base coordinate system B and the sensor coordinate system V (S301: calibration step, calibration process). The base coordinate system B has its reference which is at the portion used to attach the stereo camera 300B to the robot 200B. As in Step S101 of the first embodiment, this calibration process is performed in a state where the stereo camera 300B is removed from the robot 200B, and set on the calibration jig 900 illustrated in FIG. 7A. Also in the second embodiment, the CPU 601 performs the calibration to identify the relative position and orientation between the base coordinate system B and the sensor coordinate system V, and causes the HDD 604 to store the rotation matrix $R_C$ and the translation vector $t_C$, which are the calibration data. In addition, the CPU 601 sets the target values $^B p[i]$ and the threshold δ (S302, S303), as is in the steps S102 and S103 of the first embodiment.

Then, the CPU 501 moves the robot 200B, and causes the robot hand 202B to hold the stereo camera 300B (S304: attachment step, attachment process). Specifically, a stand (not illustrated) is placed in an area within which the robot arm 201 can move, and the stereo camera 300B is placed on the stand in advance. The CPU 501 causes the robot arm 201 and the robot hand 202B to move depending on the robot program 510, and causes the robot hand 202B to automatically hold the stereo camera 300B. With this operation, the stereo camera 300B is positioned with respect to the robot hand 202B with high accuracy. As described above, the CPU 501 attaches the stereo camera 300B to the robot 200B by controlling the motion of the robot 200B.

Then, the CPU 501 and the CPU 601 work with each other to refer to the relative relationship $R_C$ and $t_C$ calibrated and stored in the HDD 604 and teach the robot 200B by using the stereo camera 300B (S305 to S313: teaching step, teaching process).

Hereinafter, the description will be made specifically. The CPU 501 moves the robot arm 201 to a teach point which has been set in advance through an offline teaching (S305). This causes the robot 200B, that is, the robot arm 201 to take a posture in which the teaching is started. That is, in the first embodiment, a user moves the robot 200 by using the teaching pendant 800; but in the second embodiment, the CPU 501 moves the robot 200B automatically. Then, as in steps S201 to S204 described in the first embodiment, the CPU 601 performs capturing images (S306), measuring mark positions (S307), transforming coordinates (S308), and calculating the amount of positional difference (S309). As in the Step S205 described in the first embodiment, the CPU 601 determines whether the amount of positional difference is equal to or smaller than the threshold (S310).

In the second embodiment, since the robot control device 500 and the sensor control device 600 are electrically connected with each other via a communication line, the CPU 501 can refer to data on a result of the process performed by the CPU 601. If the amount of positional difference exceeds the threshold (S310: No), the CPU 501 uses calculation data on the amount of positional difference, the rotation matrix R, and the translation vector t, and calculates posture information which is the amount of adjustment for the posture of the robot 200B (S311). The CPU 501 then adjusts the posture of the robot 200B depending on the posture information (S312). That is, the CPU 501 adjusts the posture of the robot 200B depending on the amount of positional difference. Here, adjusting the posture of the robot 200B means adjusting the angles of joints of the robot arm 201, that is, adjusting the position and orientation of the robot hand 202B in the robot coordinate system O.

Hereinafter, the calculation in Step S311 will be specifically described. In the robot control device 500, there is set the tool coordinate system T whose origin is at the leading end of the robot 200B, that is, the robot hand 202B. In addition, there is also preset the position and orientation of the base coordinate system B with respect to the tool coordinate system T. Here, the position and orientation of the tool coordinate system T with respect to the robot coordinate system O is expressed as a matrix $^O H_T$. In addition, the position and orientation of the base coordinate system B with respect to the tool coordinate system T is expressed as a matrix $^{T}H_{B}$. Where the posture of the adjusted robot 200B is expressed by a matrix $^{O}H_{T'}$, the matrix $^{O}H_{T'}$ can be expressed by the following expression (9).

$$^{O}H_{T'} = {^{O}H_{T}} \, {^{T}H_{B}} \, {^{B}H_{B'}} \cdot ({^{T}H_{B}})^{-1} \quad (9)$$

The matrix $^{B}H_{B'}$ is a homogeneous transformation matrix which is calculated by using the rotation matrix R and the translation vector t calculated in Step S203, and which expresses a coordinate transformation from a current position to a measured position of the base coordinate system B. The matrix $^{B}H_{B'}$ is expressed by the following expression (10).

$$^{B}H_{B'} = \begin{bmatrix} R & t \\ 0 & 1 \end{bmatrix} \quad (10)$$

That is, in Step S311, the CPU 501 uses the expressions (9) and (10), and calculates the matrix $^{O}H_{T'}$, which expresses the position and orientation of the leading end of the robot 200B. The CPU 501 then uses the matrix $^{O}H_{T'}$ and calculates the posture information of the robot 200B, that is, the angle command for joints of the robot arm 201. The CPU 501 then moves the robot 200B depending on the posture information, and adjusts the posture of the robot 200B, in S312.

After adjusting the posture of the robot 200B, the CPU 501 performs the steps S306 to S309 again, and performs the convergence determination in Step S310 by using the threshold δ. If the amount of positional difference does not converge in Step S310, the CPU 501 performs the steps S311, S312, and S306 to S309 again. In this manner, the CPU 501 repeats the steps S306 to S312 until the amount of positional difference becomes equal to or smaller than the threshold δ and converges. That is, the CPU 501 repeatedly causes the robot 200B to perform the motion for posture adjustment of the robot 200B. Since the motion of the robot arm 201 and the measurement by the stereo camera 300 have errors, the teaching is often not completed by a single adjustment of posture. The second embodiment can position the robot hand 202B with high accuracy, by repeatedly performing the posture adjustment. As described above, in the second embodiment, the posture of the robot 200B is automatically adjusted by the CPU 501 and the CPU 601 working with each other. That is, the CPU 501 and the CPU 601 transform the coordinate values $^{V}q[i]$, measured by using the stereo camera 300B, to the measured values $^{B}q[i]$ by using the relative relationship $R_C$ and $t_C$; and adjust the posture of the robot 200B depending on the amount of positional difference between the measured values $^{B}q[i]$ and the target values $^{B}p[i]$.

If the amount of positional difference is equal to or smaller than the threshold (S310: Yes), the CPU 501 causes the HDD 504 to store the posture of the adjusted robot 200B, that is, the posture of the robot arm 201, as a teach point (S313); and ends the teaching step, that is, the teaching process.

Thus, according to the second embodiment, the automatic motion of the robot arm 201 can cause the robot hand 202B to automatically take the relative position and orientation of the robot hand 202B with respect to the workpiece holding jig 400.

Also in the second embodiment, the CPU 601 uses visual information obtained from the stereo camera 300B and the relative relationship $R_C$ and $t_C$ stored in the HDD 604, and determines the measured values $^{B}q[i]$ of the marks MK1 to MK3 with respect to the base coordinate system B. The CPU 501 then adjusts the posture of the robot 200B depending on the amount of positional difference between the measured values $^{B}q[i]$ and the target values $^{B}p[i]$ with respect to the base coordinate system B, and performs the teaching. Since the amount of positional difference used to adjust the posture of the robot 200B can be determined without affected by an error in motion of the robot arm 201 and an error in production of the robot hand 202B, the robot 200B can be taught with high accuracy.

In the second embodiment, Step S311 has been described for the case where the matrix $^{T}H_{B}$, which expresses the relative position and orientation of the base coordinate system B with respect to the tool coordinate system T of the robot arm 201, is preset. But the present disclosure is not limited to this. As described above, because the repetitive operation is performed depending on the adjustment amount, which is based on the amount of positional difference, the matrix $^{T}H_{B}$ to be set may not necessarily be determined with high accuracy. Even in a case where the matrix $^{T}H_{B}$ is tilted for example, by about 30 degrees with respect to a design value, the amount of positional difference converges through the repetitive operation and the teaching can be performed.

In addition, the matrix $^{T}H_{B}$ may not be preset. For example, the matrix $^{T}H_{B}$ can be calculated by automatically performing a known hand-eye calibration method before the teaching is started. In this case, because the robot arm 201 only has to be roughly positioned with respect to a target position and roughly face the target position, the amount of motion of the robot arm 201 produced when the hand-eye calibration is performed on the robot arm 201 may be smaller than the calibration described in the second embodiment. Thus, even when there is a structure around the robot and an area within which the robot can move is small, the robot can be calibrated and taught.

As another approach, the matrix $^{T}H_{B}$ may not be used. In this case, the robot arm 201 may be servo-controlled by using a known image-base visual servo method, so as to reduce the amount of positional difference computed by the CPU 601.

Third Embodiment

Figure 13A:
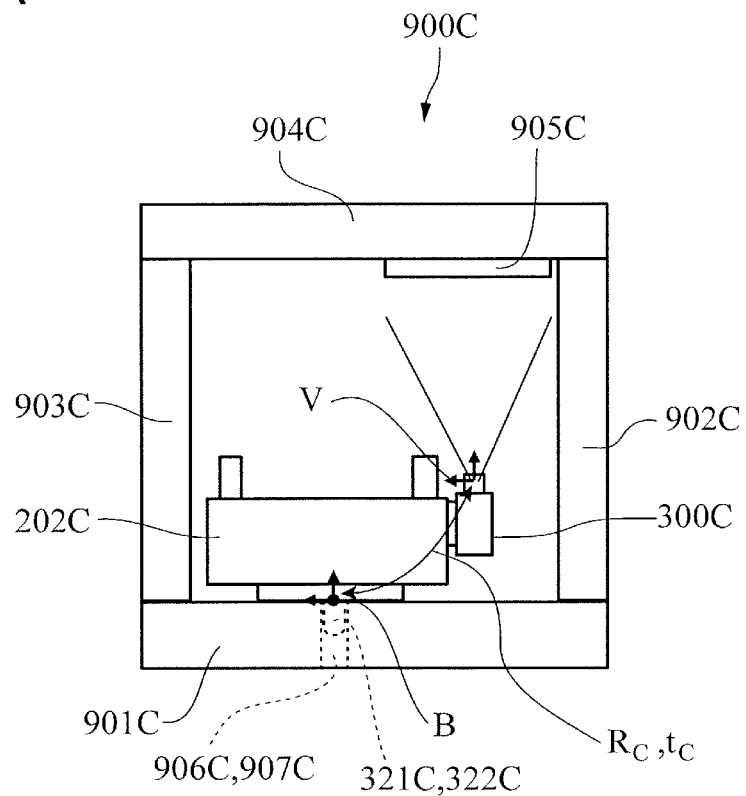
FIG. 13A is an explanatory diagram of a calibration jig of a third embodiment.
Figure 13B:
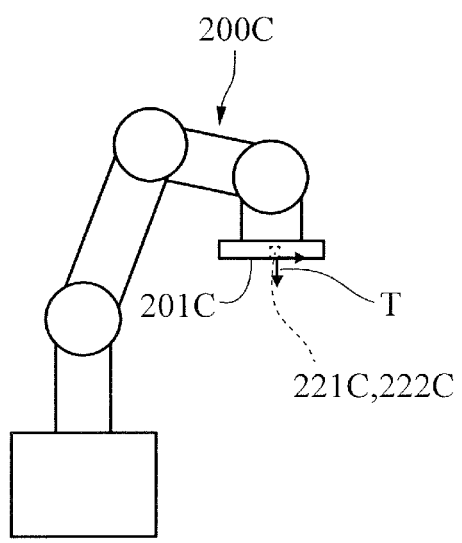
FIG. 13B is an explanatory diagram of a robot of the third embodiment.

Next, a method of teaching a robot of a robot system according to a third embodiment will be described. FIG. 13A is an explanatory diagram of a calibration jig 900C of the third embodiment. FIG. 13B is an explanatory diagram of a robot 200C of the third embodiment. In the first and the second embodiments, the description has been made for the cases where the stereo cameras 300 and 300B are, respectively, detachably attached to the robot hands 202 and 202B. In the third embodiment, a stereo camera 300C is one example of vision sensors and a robot hand 202C is one example of end effectors. In addition, the stereo camera 300C and the robot hand 202C are fixed to each other as one body. The robot hand 202C, to which the stereo camera 300C is attached as one body, is detachably attached to a flange surface 201C which is the leading end of the robot 200C. In the third embodiment, the robot 200C is a vertically articulated robot arm. When the robot hand 202C is attached to the robot 200C, the stereo camera 300C, which is attached to the robot hand 202C as one body, is attached to the robot 200C. Thus, a joint portion between the flange surface 201C, which is the leading end of the robot 200C, and the robot hand 202C is a portion which attaches the stereo camera 300C to the robot 200C.

The calibration jig 900C includes a base portion 901C, pillar portions 902C and 903C, a top plate portion 904C, and a reference pattern portion 905C. The reference pattern portion 905C is a reference object having the same structure as that of the reference pattern portion 905 described in the first embodiment. The base portion 901C and the top plate portion 904C are plate-like members which are disposed facing each other, and joined with each other via the pillar portions 902C and 903C. As illustrated in FIG. 13A, in the third embodiment, the calibration is performed by positioning the robot hand 202C and the stereo camera 300C with respect to the reference pattern portion 905C, and by causing the stereo camera 300C to capture images of the reference pattern portion 905C.

In the third embodiment, the origin of the base coordinate system B is set as a position at which the robot hand 202C is attached to the robot 200C, that is, a position at which the base coordinate system B has the same position and orientation as that of the tool coordinate system T when the robot hand 202C is attached to the robot 200C. As in the first embodiment, in the calibration jig 900C, there is measured a positional relationship between the base coordinate system B and the marks of the reference pattern portion 905C. With this operation, the relative relationship which is a relative position and orientation of the sensor coordinate system V with respect to the base coordinate system B, that is, the rotation matrix $R_C$ and the translation vector $t_C$ can be determined with high accuracy.

The robot hand 202C is provided with positioning pins 321C and 322C which serve as an engagement portion, and the flange surface 201C of the robot 200C is provided with a round hole 221C and an elongated hole 222C which serve as an engagement portion. Like the round hole 221C and the elongated hole 222C, the base portion 901C is provided with holes 906C and 907C at positions corresponding to the pins 321C and 322C. With the holes 906C and 907C, the stereo camera 300C can be positioned with respect to the reference pattern portion 905C with high reproducibility. When the calibration between the sensor coordinate system V and the base coordinate system B is performed, the stereo camera 300C is placed on the calibration jig 900C. Thus, the reference pattern portion 905C is contained in the field of view of the stereo camera 300C. When the robot hand 202C is attached to the robot 200C, the pins 321C and 322C engage with the holes 221C and 222C. Thus, the stereo camera 300C, that is, the base coordinate system B can be positioned with respect to the robot 200C with high accuracy.

The present invention is not limited to the above-described embodiments, and may be variously modified within the technical concept of the present invention. In addition, some effects described in the embodiments are merely the most suitable effects produced by the present invention. Thus, the effects by the present invention are not limited to those described in the embodiments.

In the above-described first to third embodiments, the description has been made for the case where the rotation matrix $R_C$ and the translation vector $t_C$, which are calibration data indicating the relative relationship, are stored in a memory such as the HDD 604, and the teach point data is stored in another memory such as the HDD 504, which is different from the memory such as the HDD 604. That is, the description has been made for the case where the calibration data and the teach point data are stored in different memories. The present invention, however, is not limited to this. The calibration data and the teach point data may be stored in a common memory. In addition, the description has been made for the case where the calibration data and the teach point data are stored in the internal memories. The present disclosure, however, is not limited to this. The calibration data and the teach point data may be stored in an external memory. The external memory may be a memory directly connected to the robot control device 500 or the sensor control device 600, or may be a memory connected to the robot control device 500 or the sensor control device 600 via a network.

In addition, although the first and the second embodiments have been described for the case where the vision sensor is directly attached to the robot hand of the robot, and the third embodiment has been described for the case where the vision sensor is attached to the robot via the end effector which is an intermediate member, the present disclosure is not limited to this. For example, the vision sensor may be directly attached to the leading end of the robot arm of the robot.

In addition, although the first and the second embodiments have been described for the case where the engagement portion of the vision sensor is the two positioning pins and the engagement portion of the robot hand is the round hole and the elongated hole, the present disclosure is not limited to this. The engagement portion of the robot and the engagement portion of the vision sensor may have any shape as long as the engagement portions are structured to position the vision sensor with respect to the mechanical mounting reference of the robot hand. For example, one of the robot hand and the vision sensor may be provided with three abutting surfaces, and the other may be provided with projection portions which abut against the three abutting surfaces.

In addition, although the first to the third embodiments have been described as examples for the cases where the robot hand has two or three fingers, the robot may have four or more fingers. In addition, although the end effector is suitably a robot hand, it may not be the robot hand. For example, the end effector may be a welding torch or a driver.

In addition, although the first to the third embodiments have been described for the case where the number of the marks given to the measured object is three, the present disclosure is not limited to this number. In order to determine the position and orientation of the measured object, three or more feature points are necessary. Thus, even in a case where four or more feature points are provided for example, the teaching can also be performed. The increase in the number of feature points smoothes errors when the position and orientation is determined by using the least squares method, and thus increases accuracy of the teaching.

In addition, although the first to the third embodiments have been described for the case where the vertically articulated robot arm is used, the present disclosure is not limited to this. The present disclosure may be applied to a parallel link robot arm, a horizontally articulated robot arm, or a Cartesian coordinate robot arm.

In addition, although the first to the third embodiments have been described for the cases where the stereo cameras 300, 300B, and 300C are used as the vision sensor which can measure a three-dimensional position and orientation, the present disclosure is not limited to this. For example, a vision sensor using a method, such as a pattern projection method using a projector, a laser light section method, or a Time-of-Flight method, may be used.

The present invention can also be achieved by providing a program, which achieves one or more functions of the above-described embodiments, to a system or a device via a network or a storage medium, and by one or more processors, which are included in computers of the system or the device, reading and executing the program. In addition, the present invention can also be achieved by using a circuit, such as an ASIC, which achieves one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-022565, filed Feb. 9, 2017, which is hereby incorporated by reference wherein in its entirety.

What is claimed is:

1. A method of controlling a robot system that includes a robot, the method comprising:
    obtaining visual information of an object held at a reference position with a sensor portion of a vision sensor having an engagement portion that is configured to be engaged to a portion of the robot;
    calculating a positional relationship between the sensor portion of the vision sensor and the engagement portion of the vision sensor based on the visual information of the object and position information of the reference position with a controller; and
    adjusting a teach point of the robot based on the positional relationship with the controller,
    wherein, when performing work with the robot in which the teach point is adjusted, the engagement portion of the visual sensor is engaged with the portion of the robot, and the sensor portion of the vision sensor and the portion of the robot move in accordance with a change in a posture of the robot.

2. The method according to claim 1, wherein the controller further calculates the positional relationship using calibration data that is obtained before obtaining of the visual information.

3. The method according to claim 1, wherein obtaining of the visual information includes capturing images of an object having three marks.

4. The method according to claim 1, wherein the vision sensor includes a plurality of cameras.

5. The method according to claim 1, wherein the vision sensor is a stereo camera.

6. The method according to claim 1, wherein the vision sensor includes a camera attached to the robot.

7. The method according to claim 1, wherein the controller causes a display to display a result of the adjusting.

8. The method according to claim 1, further comprising controlling the robot by a visual servo method.

9. A robot system comprising a robot and a controller, wherein the controller is configured to control the robot system by the method according to claim 1.

10. The robot system according to claim 9, wherein the robot includes a force sensor.

11. A method of controlling a robot system that includes a robot, the method comprising:
    obtaining visual information of an object held at a reference position with a sensor portion of a vision sensor having an engagement portion that is configured to be engaged to a portion of the robot;
    calculating a positional relationship between the sensor portion of the vision sensor and the engagement portion of the vision sensor based on the visual information of the object and position information of the reference position with a controller; and
    adjusting a posture of the robot based on the positional relationship with the controller,
    wherein, when performing a work with the robot in which posture is adjusted, the engagement portion of the visual sensor is engaged with the portion of the robot, and the sensor portion of the vision sensor and the portion of the robot move in accordance with a change in the posture of the robot.

12. The method according to claim 1, further comprising storing a posture of the robot after the adjustment of the teach point.

13. The method according to claim 11, wherein the obtaining of the visual information includes capturing images of an object having at least three marks.

14. The method according to claim 11, wherein the vision sensor includes a plurality of cameras.

15. The method according to claim 11, wherein the vision sensor is a stereo camera.

16. The method according to claim 11, wherein the vision sensor includes a camera attached to the robot.

17. The method according to claim 11, wherein the controller causes a display to display a result of the adjusting.

18. The method according to claim 11, further comprising controlling the robot by a visual servo method.

19. A robot system comprising a robot and a controller, wherein the controller is configured to control the robot by the method according to claim 11.

20. The robot system according to claim 19, wherein the robot includes a force sensor.

* * * * *